United States Patent
Cody et al.

[11] Patent Number: 5,935,417
[45] Date of Patent: *Aug. 10, 1999

[54] HYDROCONVERSION PROCESS FOR MAKING LUBRICATING OIL BASESTOCKS

[75] Inventors: Ian A. Cody; Douglas R. Boate; William J. Murphy, all of Baton Rouge, La.; Daniel P. Leta, Flemington, N.J.

[73] Assignee: Exxon Research and Engineering Co., Florham Park, N.J.

[ * ] Notice: This patent is subject to a terminal disclaimer.

[21] Appl. No.: 09/023,573

[22] Filed: Feb. 13, 1998

Related U.S. Application Data

[63] Continuation-in-part of application No. 08/768,252, Dec. 17, 1996.

[51] Int. Cl.⁶ .................................................. C10G 11/04
[52] U.S. Cl. ................................. 208/87; 208/97; 208/58; 208/72; 208/71; 208/88; 208/95; 208/57
[58] Field of Search ................................. 208/87, 57, 58, 208/97, 72, 74, 88, 95

[56] References Cited

U.S. PATENT DOCUMENTS

| | | | |
|---|---|---|---|
| 3,691,067 | 9/1972 | Ashton et al. | 204/264 |
| 3,732,154 | 5/1973 | Mills et al. | 208/87 |
| 3,779,896 | 12/1973 | Woodle | 208/86 |
| 4,383,913 | 5/1983 | Powell et al. | 308/59 |
| 4,610,778 | 9/1986 | Graven | 208/89 |
| 4,627,908 | 12/1986 | Miller | 208/58 |
| 4,636,299 | 1/1987 | Unmuth et al. | 208/87 |
| 4,906,350 | 3/1990 | Lucien et al. | 208/197 |
| 4,952,303 | 8/1990 | Bortz et al. | 208/216 |
| 5,013,422 | 5/1991 | Absil et al. | 208/27 |
| 5,273,645 | 12/1993 | Clark et al. | 208/87 |
| 5,292,426 | 3/1994 | Holland et al. | 208/111 |
| 5,300,213 | 4/1994 | Bartilucci et al. | 208/87 |
| 5,302,279 | 4/1994 | Degnan et al. | 208/87 |
| 5,393,408 | 2/1995 | Ziemer et al. | 208/57 |

FOREIGN PATENT DOCUMENTS

| | | | |
|---|---|---|---|
| 0 471 524 A1 | 2/1992 | European Pat. Off. | C10G 65/04 |
| 0 649 896 A1 | 4/1995 | European Pat. Off. | C10G 65/12 |

*Primary Examiner*—Helane Myers
*Attorney, Agent, or Firm*—James H. Takemoto

[57] ABSTRACT

A process for producing a lubricating oil basestock having at least 90 wt. % saturates and a VI of at least 105 by selectively hydroconverting a raffinate from a solvent extraction zone in a two step hydroconversion zone followed by a hydrofinishing zone and a dewaxing zone.

18 Claims, 10 Drawing Sheets

Reactor C Conditions: (a) 330C, 2.5 LHSV, 1800# H2; (b) 350C, 2.5 LHSV, 1800# H2; (c) 350, 1 LHSV, 1800# H2

HYDROCONVERSION PROCESS FOR MAKING LUBRICATING OIL BASESTOCKS

CROSS REFERENCE TO RELATED APPLICATIONS

This is a continuation-in-part of U.S. patent application Ser. No. 08/768,252 filed Dec. 17, 1996.

FIELD OF THE INVENTION

This invention relates to a process for preparing lubricating oil basestocks having a high saturates content, high viscosity indices and low volatilities.

BACKGROUND OF THE INVENTION

It is well known to produce lubricating oil basestocks by solvent refining. In the conventional process, crude oils are fractionated under atmospheric pressure to produce atmospheric resids which are further fractionated under vacuum. Select distillate fractions are then optionally deasphalted and solvent extracted to produce a paraffin rich raffinate and an aromatics rich extract. The raffinate is then dewaxed to produce a dewaxed oil which is usually hydrofinished to improve stability and remove color bodies.

Solvent refining is a process which selectively isolates components of crude oils having desirable properties for lubricant basestocks. Thus the crude oils used for solvent refining are restricted to those which are highly paraffinic in nature as aromatics tend to have lower viscosity indices (VI), and are therefore less desirable in lubricating oil basestocks. Also, certain types of aromatic compounds can result in unfavorable toxicity characteristics. Solvent refining can produce lubricating oil basestocks have a VI of about 95 in good yields.

Today more severe operating conditions for automobile engines have resulted in demands for basestocks with lower volatilities (while retaining low viscosities) and lower pour points. These improvements can only be achieved with basestocks of more isoparaffinic character, i.e., those with VI's of 105 or greater. Solvent refining alone cannot economically produce basestocks having a VI of 105 with typical crudes. Nor does solvent refining alone typically produce basestocks with high saturates contents. Two alternative approaches have been developed to produce high quality lubricating oil basestocks; (1) wax isomerization and (2) hydrocracking. Both of the methods involve high capital investments. In some locations wax isomerization economics can be adversely impacted when the raw stock, slack wax, is highly valued. Also, the typically low quality feedstocks used in hydrocracking, and the consequent severe conditions required to achieve the desired viscometric and volatility properties can result in the formation of undesirable (toxic) species. These species are formed in sufficient concentration that a further processing step such as extraction is needed to achieve a non-toxic base stock.

An article by S. Bull and A. Marmin entitled "Lube Oil Manufacture by Severe Hydrotreatment", Proceedings of the Tenth World Petroleum Congress, Volume 4, Developments in Lubrication, PD 19(2), pages 221–228, describes a process wherein the extraction unit in solvent refining is replaced by a hydrotreater.

U.S. Pat. No. 3,691,067 describes a process for producing a medium and high VI oil by hydrotreating a narrow cut lube feedstock. The hydrotreating step involves a single hydrotreating zone. U.S. Pat. No. 3,732,154 discloses hydrofinishing the extract or raffinate from a solvent extraction process. The feed to the hydrofinishing step is derived from a highly aromatic source such as a naphthenic distillate. U.S. Pat. No. 4,627,908 relates to a process for improving the bulk oxidation stability and storage stability of lube oil basestocks derived from hydrocracked bright stock. The process involves hydrodenitrification of a hydrocracked bright stock followed by hydrofinishing.

U.S. Pat. No. 4,636,299 discloses a process for reducing the pour point of a feedstock containing nitrogen and sulfur-containing compounds wherein the feedstock is solvent extracted with N-methyl-2-pyrrolidone to produce a raffinate, the raffinate is hydrotreated to convert the nitrogen and sulfur containing compounds to ammonia and hydrogen sulfide, stripped of ammonia and hydrogen sulfide and stripped effluent cat dewaxed.

It would be desirable to supplement the conventional solvent refining process so as to produce high VI, low volatility oils which have excellent toxicity, oxidative and thermal stability, fuel economy and cold start properties without incurring any significant yield debit which process requires much lower investment costs than competing technologies such as hydrocracking.

SUMMARY OF THE INVENTION

This invention relates to a process for producing a lubricating oil basestock meeting at least 90% saturates by selectively hydroconverting a raffinate produced from solvent refining a lubricating oil feedstock which comprises:

(a) conducting the lubricating oil feedstock to a solvent extraction zone and separating therefrom an aromatics rich extract and a paraffins rich raffinate;

(b) stripping the raffinate of solvent to produce a raffinate feed having a dewaxed oil viscosity index from about 85 to about 105 and a final boiling point of no greater than about 650° C.;

(c) passing the raffinate feed to a first hydroconversion zone and processing the raffinate feed in the presence of a non-acidic hydroconversion catalyst at a temperature of from 340 to 420° C., a hydrogen partial pressure of from 1000 to 2500 psig, space velocity of 0.2 to 3.0 LHSV and a hydrogen to feed ratio of from 500 to 5000 Scf/B to produce a first hydroconverted raffinate;

(d) passing the hydroconverted raffinate from the first hydroconversion zone to a second hydroconversion zone and processing the hydroconverted raffinate in the presence of a non-acidic hydroconversion catalyst at a temperature of from 340 to 400° C. provided that the temperature in second hydroconversion is not greater than the temperature in the first hydroconversion zone, a hydrogen partial pressure of from 1000 to 2500 psig, a space velocity of from 0.2 to 3.0 LHSV and a hydrogen to feed ratio of from 500 to 5000 Scf/B to produce a second hydroconverted raffinate;

(e) passing the second hydroconverted raffinate to a hydrofinishing zone and conducting cold hydrofinishing of the second hydroconverted raffinate in the presence of a hydrofinishing catalyst at a temperature of from 260 to 360° C., a hydrogen partial pressure of from 1000 to 2500 psig, a space velocity of from 0.2 to 5 LHSV and a hydrogen to feed ratio of from 500 to 5000 Scf/B to produce a hydrofinished raffinate;

(f) passing the hydrofinished raffinate to a separation zone to remove products having a boiling less than about 250° C.; and (g) passing the hydrofinished raffinate from step (f) to a dewaxing zone and catalytically dewaxing the hydrofinished raffinate under catalytic dewaxing conditions in the presence of hydrogen and a catalytic dewaxing catalyst comprising a metal hydrogenation component and a crystalline 10 or 12 ring molecular sieve.

In another embodiment, this invention relates to a process for selectively hydroconverting a raffinate produced from solvent refining a lubricating oil feedstock which comprises:

(a) conducting the lubricating oil feedstock to a solvent extraction zone and separating therefrom an aromatics rich extract and a paraffins rich raffinate;

(b) stripping the raffinate of solvent to produce a raffinate feed having a dewaxed oil viscosity index from about 85 to about 105 and a final boiling point of no greater than about 650° C.;

(c) passing the raffinate feed to a first hydroconversion zone and processing the raffinate feed in the presence of a non-acidic hydroconversion catalyst at a temperature of from 340 to 420° C., a hydrogen partial pressure of from 1000 to 2500 psig, space velocity of 0.2 to 3.0 LHSV and a hydrogen to feed ratio of from 500 to 5000 Scf/B to produce a first hydroconverted raffinate;

(d) passing the hydroconverted raffinate from the first hydroconversion zone to a second hydroconversion zone and processing the hydroconverted raffinate in the presence of a non-acidic hydroconversion catalyst at a temperature of from 340 to 400° C. provided that the temperature in the second hydroconversion is not greater than the temperature in the first hydroconversion zone, a hydrogen partial pressure of from 1000 to 2500 psig, a space velocity of from 0.2 to 3.0 LHSV and a hydrogen to feed ratio of from 500 to 5000 Scf/B to produce a second hydroconverted raffinate;

(e) passing the second hydroconverted raffinate to a hydrofinishing reaction zone and conducting cold hydrofinishing of the second hydroconverted raffinate in the presence of a hydrofinishing catalyst at a temperature of from 260 to 360° C., a hydrogen partial pressure of from 1000 to 2500 psig, a space velocity of from 0.2 to 5 LHSV and hydrogen to feed ratio of from 500 to 5000 Scf/B to produce a hydrofinished raffinate;

(f) solvent dewaxing the hydrofinished raffinate under solvent dewaxing conditions to obtain a dewaxed oil having a pour point less than about 10° C.; and (g) catalytically dewaxing the solvent dewaxed oil under catalytic dewaxing conditions in the presence of hydrogen and a catalytic dewaxing catalyst comprising a metal hydrogenation component and a crystalline 10 or 12 ring molecular sieve to produce a dewaxed basestock.

In yet another embodiment, the cold hydrofinishing step is moved from after the second hydroconversion zone to after the catalytic dewaxing step for either of the embodiments set forth above.

The process according to the invention produces in good yields a basestock which has VI and volatility properties meeting future industry engine oil standards while achieving good oxidation stability, cold start, fuel economy, and thermal stability properties. In addition, toxicity tests show that the basestock has excellent toxicological properties as measured by tests such as the FDA(c) test.

DETAILED DESCRIPTION OF THE INVENTION

Figure 1:
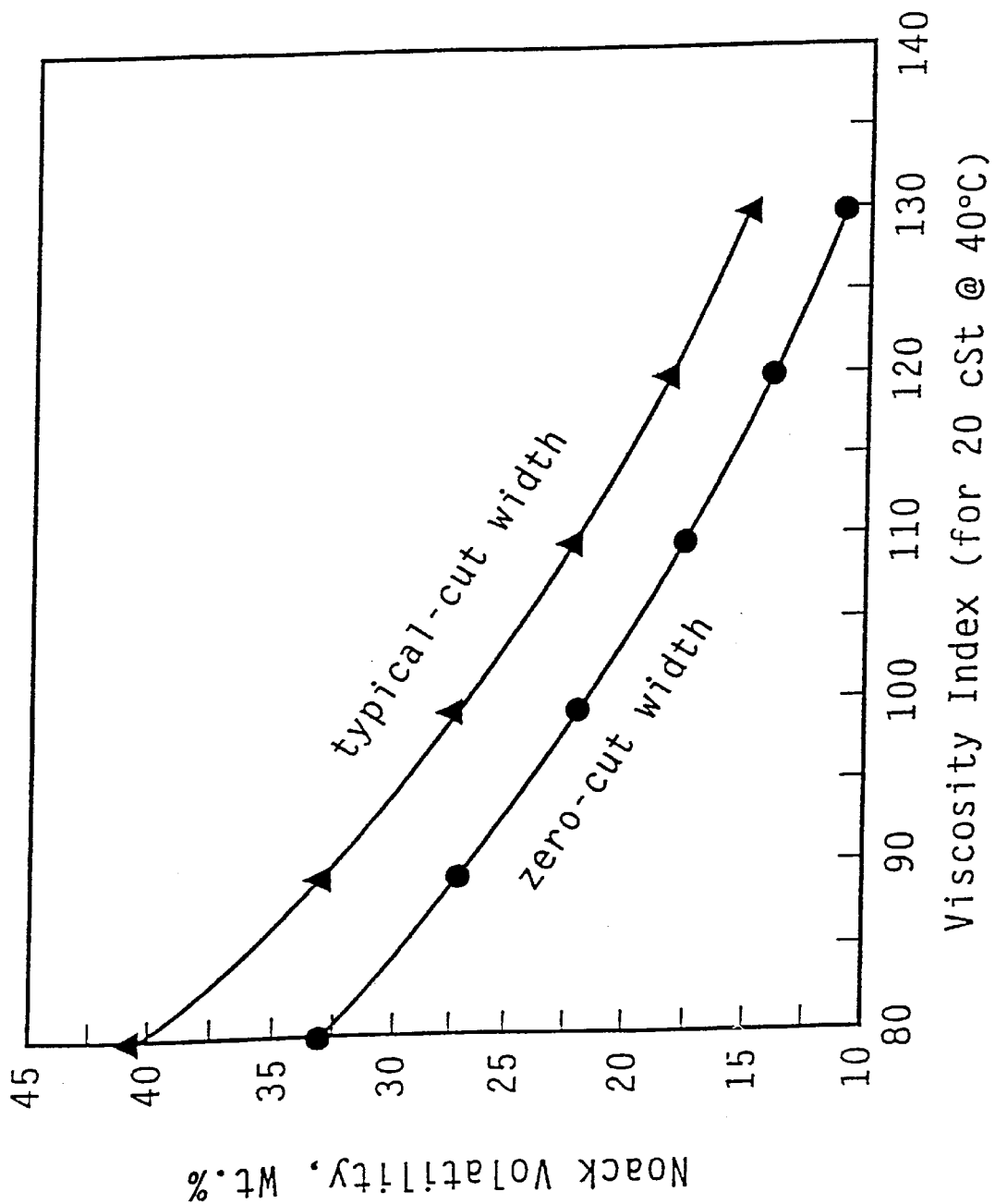
FIG. 1 is a plot of NOACK volatility vs. viscosity for a 100N basestock.

The solvent refining of select crude oils to produce lubricating oil basestocks typically involves atmospheric distillation, vacuum distillation, extraction, dewaxing and hydrofinishing. Because basestocks having a high isoparaffin content are characterized by having good viscosity index (VI) properties and suitable low temperature properties, the crude oils used in the solvent refining process are typically paraffinic crudes. One method of classifying lubricating oil basestocks is that used by the American Petroleum Institute (API). API Group II basestocks have a saturates content of 90 wt. % or greater, a sulfur content of not more than 0.03 wt. % and a viscosity index (VI) greater than 80 but less than 120. API Group III basestocks are the same as Group II basestocks except that the VI is greater than or equal to 120.

Generally, the high boiling petroleum fractions from atmospheric distillation are sent to a vacuum distillation unit, and the distillation fractions from this unit are solvent extracted. The residue from vacuum distillation which may be deasphalted is sent to other processing. Other feeds to solvent extraction include waxy streams such as dewaxed oils and foots oils.

The solvent extraction process selectively dissolves the aromatic components in an extract phase while leaving the more paraffinic components in a raffinate phase. Naphthenes are distributed between the extract and raffinate phases. Typical solvents for solvent extraction include phenol, furfural and N-methyl pyrrolidone. By controlling the solvent to oil ratio, extraction temperature and method of contacting distillate to be extracted with solvent, one can control the degree of separation between the extract and raffinate phases.

In recent years, solvent extraction has been replaced by hydrocracking as a means for producing high VI basestocks in some refineries. The hydrocracking process utilizes low quality feeds such as feed distillate from the vacuum distillation unit or other refinery streams such as vacuum gas oils and coker gas oils. The catalysts used in hydrocracking are typically sulfides of Ni, Mo, Co and W on an acidic support such as silica/alumina or alumina containing an acidic promoter such as fluorine. Some hydrocracking catalysts also contain highly acidic zeolites. The hydrocracking process may involve hetero-atom removal, aromatic ring saturation, dealkylation of aromatics rings, ring opening, straight chain and side-chain cracking, and wax isomerization depending on operating conditions. In view of these reactions, separation of the aromatics rich phase that occurs in solvent extraction is an unnecessary step since hydrocracking reduces aromatics content to very low levels.

By way of contrast, the process of the present invention utilizes a three step hydroconversion of the raffinate from the solvent extraction unit under conditions which minimizes hydrocracking and passing waxy components through the process without wax isomerization. Thus, dewaxed oil (DWO) and low value foots oil streams can be added to the raffinate feed whereby the wax molecules pass unconverted through the process and may be recovered as a valuable by-product. Moreover, unlike hydrocracking, the present process takes place without disengagement, i.e., without any intervening steps involving gas/liquid products separations. The product of the subject three step process has a saturates content greater than 90 wt. %, preferably greater than 95 wt. %. Thus product quality is similar to that obtained from hydrocracking without the high temperatures and pressures required by hydrocracking which results in a much greater investment expense.

The raffinate from the solvent extraction is preferably under-extracted, i.e., the extraction is carried out under conditions such that the raffinate yield is maximized while still removing most of the lowest quality molecules from the feed. Raffinate yield may be maximized by controlling extraction conditions, for example, by lowering the solvent to oil treat ratio and/or decreasing the extraction temperature. The raffinate from the solvent extraction unit is stripped of solvent and then sent to a first hydroconversion unit containing a hydroconversion catalyst. This raffinate feed has a viscosity index of from about 85 to about 105 and a boiling range not to exceed about 650° C., preferably less than 600° C., as determined by ASTM 2887 and a viscosity of from 3 to 15 cSt at 100° C.

Hydroconversion catalysts are those containing Group VIB metals (based on the Periodic Table published by Fisher Scientific), and non-noble Group VIII metals, i.e., iron, cobalt and nickel and mixtures thereof. These metals or mixtures of metals are typically present as oxides or sulfides on refractory metal oxide supports.

It is important that the metal oxide support be non-acidic so as to control cracking. A useful scale of acidity for catalysts is based on the isomerization of 2-methyl-2-pentene as described by Kramer and McVicker, J. Catalysis, 92, 355(1985). In this scale of acidity, 2-methyl-2-pentene is subjected to the catalyst to be evaluated at a fixed temperature, typically 200° C. In the presence of catalyst sites, 2-methyl-2-pentene forms a carbenium ion. The isomerization pathway of the carbenium ion is indicative of the acidity of active sites in the catalyst. Thus weakly acidic sites form 4-methyl-2-pentene whereas strongly acidic sites result in a skeletal rearrangement to 3-methyl-2-pentene with very strongly acid sites forming 2,3-dimethyl-2-butene. The mole ratio of 3-methyl-2-pentene to 4-methyl-2-pentene can be correlated to a scale of acidity. This acidity scale ranges from 0.0 to 4.0. Very weakly acidic sites will have values near 0.0 whereas very strongly acidic sites will have values approaching 4.0. The catalysts useful in the present process have acidity values of less than about 0.5, preferably less than about 0.3. The acidity of metal oxide supports can be controlled by adding promoters and/or dopants, or by controlling the nature of the metal oxide support, e.g., by controlling the amount of silica incorporated into a silica-alumina support. Examples of promoters and/or dopants include halogen, especially fluorine, phosphorus, boron, yttria, rare-earth oxides and magnesia. Promoters such as halogens generally increase the acidity of metal oxide supports while mildly basic dopants such as yttria or magnesia tend to decrease the acidity of such supports.

Suitable metal oxide supports include low acidic oxides such as silica, alumina or titania, preferably alumina. Preferred aluminas are porous aluminas such as gamma or eta having average pore sizes from 50 to 200 Å, preferably 75 to 150 Å, a surface area from 100 to 300 m$^2$/g, preferably 150 to 250 m$^2$/g and a pore volume of from 0.25 to 1.0 cm$^3$/g, preferably 0.35 to 0.8 cm$^3$/g. The supports are preferably not promoted with a halogen such as fluorine as this generally increases the acidity of the support above 0.5.

Preferred metal catalysts include cobalt/molybdenum (1–5% Co as oxide, 10–25% Mo as oxide) nickel/molybdenum (1–5% Ni as oxide, 10–25% Co as oxide) or nickel/tungsten (1–5% Ni as oxide, 10–30% W as oxide) on alumina. Especially preferred are nickel/molybdenum catalysts such as KF-840.

Hydroconversion conditions in the first hydroconversion unit include a temperature of from 340 to 420° C., preferably 350 to 400° C., a hydrogen partial pressure of from 1000 to 2500 psig (7.0 to 17.3 mPa), preferably 1000 to 2000 psig (7.0 to 13.9 mPa), a space velocity of from 0.2 to 3.0 LHSV, preferably 0.3 to 1.0 LHSV, and a hydrogen to feed ratio of from 500 to 5000 Scf/B (89 to 890 m$^3$/m$^3$), preferably 2000 to 4000 Scf/B (356 to 712 m$^3$/m$^3$).

The hydroconverted raffinate from the first hydroconversion unit is conducted to a second hydroconversion unit. The hydroconverted raffinate is preferably passed through a heat exchanger located between the first and second hydroconversion units so that the second hydroconversion unit can be run at cooler temperatures, if desired. Temperatures in the second hydroconversion unit should not exceed the temperature used in the first hydroconversion unit. Conditions in the second hydroconversion unit include a temperature of from 340 to 400° C., preferably 350 to 385° C., a hydrogen partial pressure of from 1000 to 2500 psig (7.0 to 17.3 Mpa), preferably 1000 to 2000 psig (7.0 to 13.9 Mpa), a space velocity of from 0.2 to 3.0 LHSV, preferably 0.3 to 1.5 LHSV, and a hydrogen to feed ratio of from 500 to 5000 Scf/B (89 to 890 m$^3$/m$^3$), preferably 2000 to 4000 Scf/B (356 to 712 m$^3$/m$^3$). The catalyst in the second hydroconversion unit can be the same as in the first hydroconversion unit, although a different hydroconversion catalyst may be used.

The hydroconverted raffinate from the second hydroconversion unit is then conducted to cold hydrofinishing unit. A heat exchanger is preferably located between these units. Reaction conditions in the hydrofinishing unit are mild and include a temperature of from 260 to 360° C., preferably 290 to 350° C., more preferably 290 to 330° C., a hydrogen partial pressure of from 1000 to 2500 psig (7.0 to 17.3 mPa), preferably 1000 to 2000 psig (7.0 to 13.9 mPa), a space velocity of from 0.2 to 5.0 LHSV, preferably 0.7 to 3.0 LHSV, and a hydrogen to feed ratio of from 500 to 5000 SCF/B (89 to 890 m$^3$/m$^3$), preferably 2000 to 4000 Scf/B (356 to 712 m$^3$/m$^3$). The catalyst in the cold hydrofinishing unit may be the same as in the first hydroconversion unit. However, more acidic catalyst supports such as silica-alumina, zirconia and the like may be used in the cold hydrofinishing unit.

In order to prepare a finished basestock, the hydroconverted raffinate from the hydrofinishing unit is conducted to a separator e.g., a vacuum stripper (or fractionation) to separate out low boiling products if the separator is followed by a catalytic dewaxing step. Such products may include hydrogen sulfide and ammonia formed in the first two reactors. If desired, a stripper may be situated between the second hydroconversion unit and the hydrofinishing unit, but this is not essential to produce basestocks according to the invention.

The hydroconverted raffinate separated from the separator is then conducted to a dewaxing unit. Catalytic dewaxing, solvent dewaxing or a combination may accomplish dewaxing thereof.

The catalysts useful in the catalytic dewaxing step include crystalline 10 and 12 ring molecular sieves and a metal hydrogenation component. Crystalline molecular sieves include alumino silicates and aluminum phosphates. Examples of crystalline alumino silicates include zeolites such as ZSM-5, ZSM-11, ZSM-12, theta-1 (ZSM-22), ZSM-23, ZSM-35, ferrierite, ZSM-38, ZSM-48, ZSM-57, beta, mordenite and offretite. Examples of crystalline aluminum phosphates include SAPO-11, SAPO-41, SAPO-31, MAPO-11 and MAPO-31. Preferred molecular sieves include ZSM-5, theta-1, ZSM-23, ferrierite and SAPO-11.

The dewaxing catalyst may also contain an amorphous component. The acidity of the amorphous component is preferably from 0.3 to 2.5, preferably 0.5 to 2.0 on the Kramer/McVicker acidity scale described above. Examples of amorphous materials include silica-alumina, halogenated alumina, acidic clays, silica-magnesia, yttria silica-alumina and the like. Especially preferred is silica-alumina.

If the dewaxing catalyst contains an amorphous component, the crystalline molecular sieve/metal hydrogenation component/amorphous component may be composited together. The hydrogenation metal can be deposited on each component separately or can be deposited on the composited catalyst. In the alternative, the crystalline molecular sieve and amorphous component can be in a layered configuration. Preferably, the top layer in the reaction vessel is the amorphous component and the lower layer is the crystalline molecular sieve, although the configuration can be reversed with the top layer as the molecular sieve and the bottom layer as the amorphous component. In the layered configuration, the hydrogenation metal should be deposited on both the molecular sieve and the amorphous component.

The metal hydrogenation component of the dewaxing catalyst may be at least one metal from the Group VIB and Group VIII of the Periodic Table (published by Sargent-Welch Scientific Company). Preferred metals are Group VIII noble metals, especially palladium and platinum.

The dewaxing catalyst may contain, based on the weight of total catalyst, from 5 to 95 wt. % of crystalline molecular sieve, from 0 to 90 wt. % of amorphous component and from 0.1 to 30 wt. % of metal hydrogenation component with the balance being matrix material.

The dewaxing catalyst may also include a matrix or binder which is a material resistant to process conditions and which is substantially non-catalytic under reaction conditions. Matrix materials may be synthetic or naturally occurring materials such as clays, silica and metal oxides. Matrix materials which are metal oxides include single oxides such as alumina, binary compositions such as silica-magnesia and ternary compositions such as silica-alumina-zirconia.

Process conditions in the catalytic dewaxing zone include a temperature of from 240 to 420° C., preferably 270 to 400° C., a hydrogen partial pressure of from 3.45 to 34.5 mPa (500 to 5000 psi), preferably 5.52 to 20.7 mPa, a liquid hourly space velocity of from 0.1 to 10 v/v/hr, preferably 0.5 to 3.0, and a hydrogen circulation rate of from 89 to 1780 $m^3/m^3$ (500 to 10000 scf/B), preferably 178 to 890 $m^3/m^3$.

In an alternative embodiment, the hydroconverted raffinate from the cold hydrofinishing unit or the hydroconverted raffinate from the hydroconversion zone may be conducted to a solvent dewaxer with or without, preferably with a stripping step to remove low boiling products. The solvent dewaxing process typically involves mixing feed with solvent at atmospheric pressure, separating precipitated wax and recovering solvent for recycling. The hydroconverted raffinate is mixed with chilled solvent to form an oil-solvent solution and precipitated wax is thereafter separated by, for example filtration. The temperature and solvent are selected so that the oil is dissolved by the chilled solvent while the wax is precipitated. The solvent dewaxer may then be followed by a catalytic dewaxing step such as described above. Because solvent dewaxing typically occurs at atmospheric pressure, it may be necessary to pressurize the solvent dewaxed oil prior to the catalytic dewaxing step.

A particularly suitable solvent dewaxing process involves the use of a cooling tower where solvent is prechilled and added incrementally at several points along the height of the cooling tower. The oil-solvent mixture is agitated during the chilling step to permit substantially instantaneous mixing of the prechilled solvent with the oil. The prechilled solvent is added incrementally along the length of the cooling tower so as to maintain an average chilling rate at or below 10° F./minute, usually between about 1 to about 5° F./minute. The final temperature of the oil-solvent/precipitated wax mixture in the cooling tower will usually be between 0 and 50° F. (−17.8 to 10° C.). The mixture may then be sent to a scraped surface chiller to separate precipitated wax from the mixture.

In general, the amount of solvent added will be sufficient to provide a liquid/solid weight ration between the range of 5/1 and 20/1 at the dewaxing temperature and a solvent/oil volume ratio between 1.5/1 to 5/1. The solvent dewaxed oil is typically dewaxed to a pour point from +10° C. to −20° C.

Representative dewaxing solvents are aliphatic ketones having 3–6 carbon atoms such as methyl ethyl ketone and methyl isobutyl ketone, low molecular weight hydrocarbons such as propane and butane, and mixtures thereof. The solvents may be mixed with other solvents such as benzene, toluene or xylene. Further descriptions of solvent dewaxing process useful herein are disclosed in U.S. Pat. Nos. 3,773,650 and 3,775,288 which are incorporated herein in their entirety.

The solvent dewaxed oil may be suitable as a lubricating oil basestock. However in the present embodiment, the solvent dewaxed oil is subjected to a catalytic dewaxing step to further lower the pour point using the catalytic dewaxing catalysts described above. The sequence of solvent dewaxing followed by catalytic dewaxing is designated as trim dewaxing. As noted previously, the dewaxing catalyst may comprise a molecular sieve loaded with a metal hydrogenation component, may be a composite of a metal loaded combination of crystalline molecular sieve and amorphous component or may be a layered configuration wherein the layers contain an amorphous component, a crystalline molecular sieve, and a metal hydrogenation component.

In either processing sequence, i.e., 2-step hydroconversion—cold hydrofinishing—catalytic dewaxing, or 2-step hydroconversion—cold hydrofinishing—solvent dewaxing—catalytic dewaxing, the final catalytic dewaxing step may be followed by a second cold hydrofinishing step under the cold hydrofinishing conditions described above. This second cold hydrofinishing step would be used in those instances where needed to meet product quality requirements such as color or light stability.

Alternatively, the processing sequences may omit the first cold hydrofinishing step and use only a final cold hydrofinishing step. These sequences are defined as 2-step hydroconversion—catalytic dewaxing—cold hydrofinishing, or hydroconversion—solvent dewaxing—catalytic dewaxing—cold hydrofinishing.

The lubricating oil basestock produced by the process according to the invention is characterized by the following properties: viscosity index of at least about 100, preferably at least 105 and saturates of at least 90%, preferably at least 95 wt. %, NOACK volatility improvement (as measured by DIN 51581) over raffinate feedstock of at least about 3 wt. %, preferably at least about 5 wt. %, at the same viscosity within the range 3.5 to 6.5 cSt viscosity at 100° C., pour point of −15° C. or lower, and a low toxicity as determined by IP346 or phase 1 of FDA (c). IP346 is a measure of polycyclic aromatic compounds. Many of these compounds are carcinogens or suspected carcinogens, especially those with so-called bay regions [see Accounts Chem. Res. 17, 332(1984) for further details]. The present process reduces these polycyclic aromatic compounds to such levels as to pass carcinogenicity tests. The FDA (c) test is set forth in 21 CFR 178.3620 and is based on ultraviolet absorbances in the 300 to 359 nm range.

As can be seen from FIG. 1, NOACK volatility is related to VI for any given basestock. The relationship shown in FIG. 1 is for a light basestock (about 100N). If the goal is to meet a 22 wt. % NOACK volatility for a 100N oil, then the oil should have a VI of about 110 for a product with typical-cut width, e.g., 5 to 50% off by GCD at 60° C. Volatility improvements can be achieved with lower VI product by decreasing the cut width. In the limit set by zero cut width, one can meet 22% NOACK volatility at a VI of about 100. However, this approach, using distillation alone, incurs significant yield debits.

Hydrocracking is also capable of producing high VI, and consequently low NOACK volatility basestocks, but is less selective (lower yields) than the process of the invention. Furthermore both hydrocracking and processes such as wax isomerization destroy most of the molecular species responsible for the solvency properties of solvent refined oils. The latter also uses wax as a feedstock whereas the present process is designed to preserve wax as a product and does little, if any, wax conversion.

Figure 2:
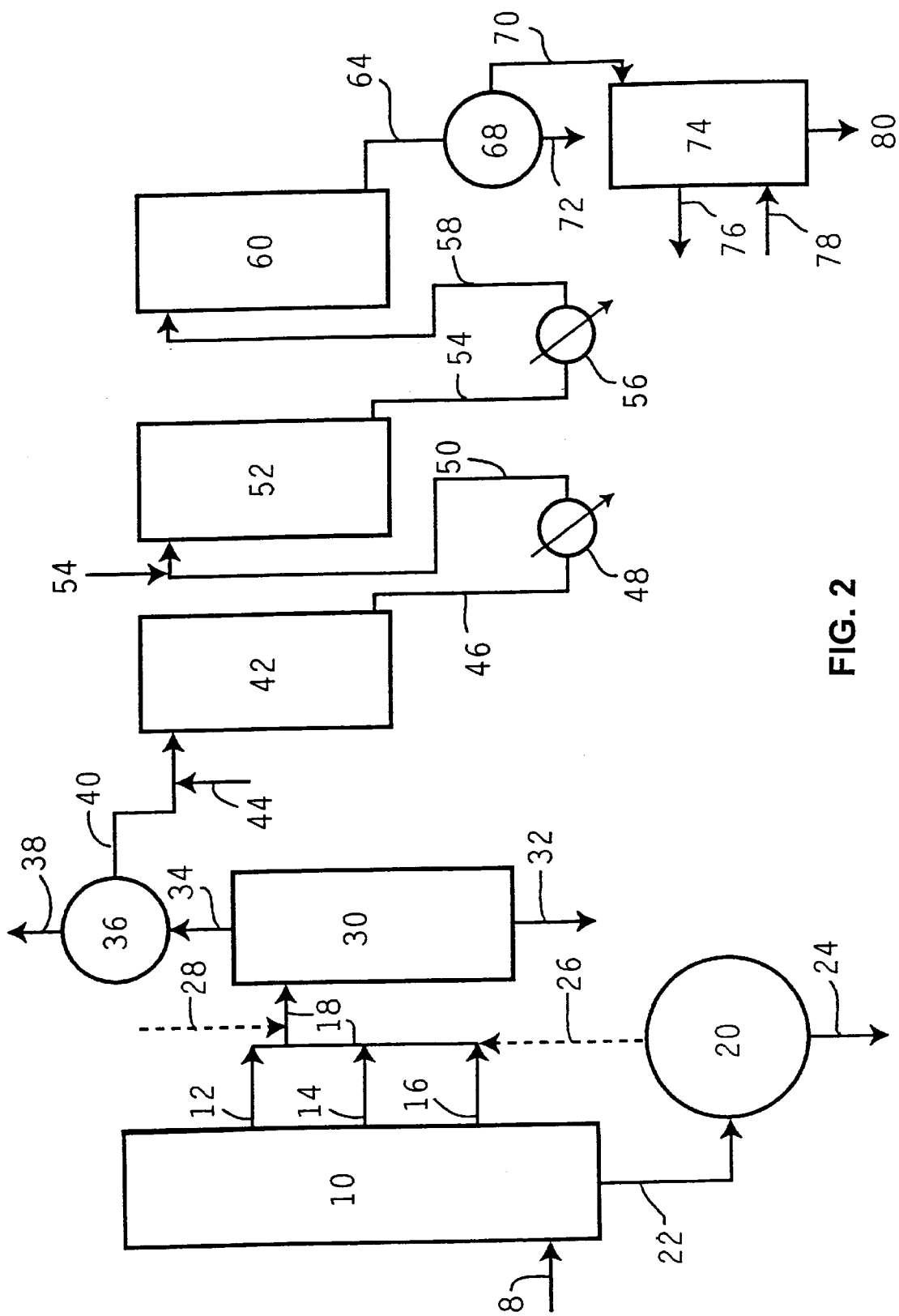
FIG. 2 is a schematic flow diagram of the hydroconversion process.

The process of the invention is further illustrated by FIG. 2. The feed 8 to vacuum pipestill 10 is typically an atmospheric reduced crude from an atmospheric pipestill (not shown). Various distillate cuts shown as 12 (light), 14 (medium) and 16 (heavy) may be sent to solvent extraction unit 30 via line 18. These distillate cuts may range from about 200° C. to about 650° C. The bottoms from vacuum pipestill 10 may be sent through line 22 to a coker, a visbreaker or a deasphalting extraction unit 20 where the bottoms are contacted with a deasphalting solvent such as propane, butane or pentane. The deasphalted oil may be combined with distillate from the vacuum pipestill 10 through line 26 provided that the deasphalted oil has a boiling point no greater than about 650° C. or is preferably sent on for further processing through line 24. The bottoms from deasphalter 20 can be sent to a visbreaker or used for asphalt production. Other refinery streams may also be added to the feed to the extraction unit through line 28 provided they meet the feedstock criteria described previously for raffinate feedstock.

In extraction unit 30, the distillate cuts are solvent extracted with N-methyl pyrrolidone and the extraction unit is preferably operated in countercurrent mode. The solvent-to-oil ratio, extraction temperature and percent water in the solvent are used to control the degree of extraction, i.e., separation into a paraffins rich raffinate and an aromatics rich extract. The present process permits the extraction unit to operate to an "under extraction" mode, i.e., a greater amount of aromatics in the paraffins rich raffinate phase. The aromatics rich extract phase is sent for further processing through line 32. The raffinate phase is conducted through line 34 to solvent stripping unit 36. Stripped solvent is sent through line 38 for recycling and stripped raffinate is conducted through line 40 to first hydroconversion unit 42.

The first hydroconversion unit 42 contains KF-840 catalyst which is nickel/molybdenum on an alumina support and available from Akzo Nobel. Hydrogen is admitted to unit or reactor 42 through line 44. Gas chromatographic comparisons of the hydroconverted raffinate indicate that almost no wax isomerization is taking place. While not wishing to be bound to any particular theory since the precise mechanism for the VI increase which occurs in this stage is not known with certainty, it is known that heteroatoms are being removed, aromatic rings are being saturated and naphthene rings, particularly multi-ring naphthenes, are selectively eliminated.

Hydroconverted raffinate from hydroconversion unit 42 is conducted through line 46 to heat exchanger 48 where the hydroconverted raffinate stream may be cooled if desired. The cooled raffinate stream is conducted through line 50 to a second hydroconversion unit 52. Additional hydrogen, if needed, is added through line 54. This second hydroconversion unit is operated at a lower temperature (when required to adjust product quality) than the first hydroconversion unit 42. While not wishing to bound to any theory, it is believed that the capability to operate the second unit 52 at lower temperature shifts the equilibrium conversion between saturated species and other unsaturated hydrocarbon species back towards increased saturates concentration. In this way, the concentration of saturates can be maintained at greater than 90% wt. % by appropriately controlling the combination of temperature and space velocity in second hydroconversion unit 52.

Hydroconverted raffinate from unit 52 is conducted through line 54 to a second heater exchanger 56. After additional heat is removed through heat exchanger 56, cooled hydroconverted raffinate is conducted through line 58 to cold hydrofinishing unit 60. Temperatures in the hydrofinishing unit 60 are more mild than those of hydroconversion units 42 and 52. Temperature and space velocity in cold hydrofinishing unit 60 are controlled to reduce the toxicity to low levels, i.e., to a level sufficiently low to pass standard toxicity tests. This may be accomplished by reducing the concentration of polynuclear aromatics to very low levels.

Hydrofinished raffinate is then conducted through line 64 to separator 68. Light liquid products and gases are separated and removed through line 72. The remaining hydrofinished raffinate is conducted through line 70 to dewaxing unit 74. Dewaxing may occur by the use of solvents introduced through line 78 which may be followed by cooling, by catalytic dewaxing or by a combination thereof. If dewaxing unit 74 utilizes solvent dewaxing, then hydrofinished raffinate may be conducted directly from reactor 60 to dewaxing unit 74 without going through separator 68. The solvent dewaxed oil from unit 74 may then be sent to a second dewaxing unit (not shown) wherein catalytic dewaxing of the solvent dewaxed oil occurs. If dewaxing unit 74 utilizes catalytic dewaxing, then the hydrofinished raffinate from reactor 60 should go through separator 68 before being conducted to dewaxing unit 74. Catalytic dewaxing involves selective hydrocracking with or without hydroisomerization as a means to create low pour point lubricant basestocks. Solvent dewaxing with optional cooling separates waxy molecules from the hydroconverted lubricant basestock thereby lowering the pour point. In markets where waxes are valued, hydrofinished raffinate is preferably contacted with methyl isobutyl ketone followed by the DILCHILL® Dewaxing Process developed by Exxon. This method is well known in the art. Finished lubricant basestock is removed through line 76 and waxy product through line 80.

While not wishing to be bound by any theory, the factors affecting saturates, VI and toxicity are discussed as follows. The term "saturates" refers to the sum of all saturated rings, paraffins and isoparaffins. In the present raffinate hydroconversion process, under-extracted (e.g. 92 VI) light and medium raffinates including isoparaffins, n-paraffins, naphthenes and aromatics having from 1 to about 6 rings are processed over a non-acidic catalyst which primarily operates to (a) hydrogenate aromatic rings to naphthenes and (b) convert ring compounds to leave isoparaffins in the lubes boiling range by either dealkylation or by ring opening of naphthenes. The catalyst is not an isomerization catalyst and therefore leaves paraffinic species in the feed largely unaffected. High melting paraffins and isoparaffins are removed by a subsequent dewaxing step. Thus other than residual wax the saturates content of a dewaxed oil product is a function of the irreversible conversion of rings to isoparaffins and the reversible formation of naphthenes from aromatic species.

Figure 3:
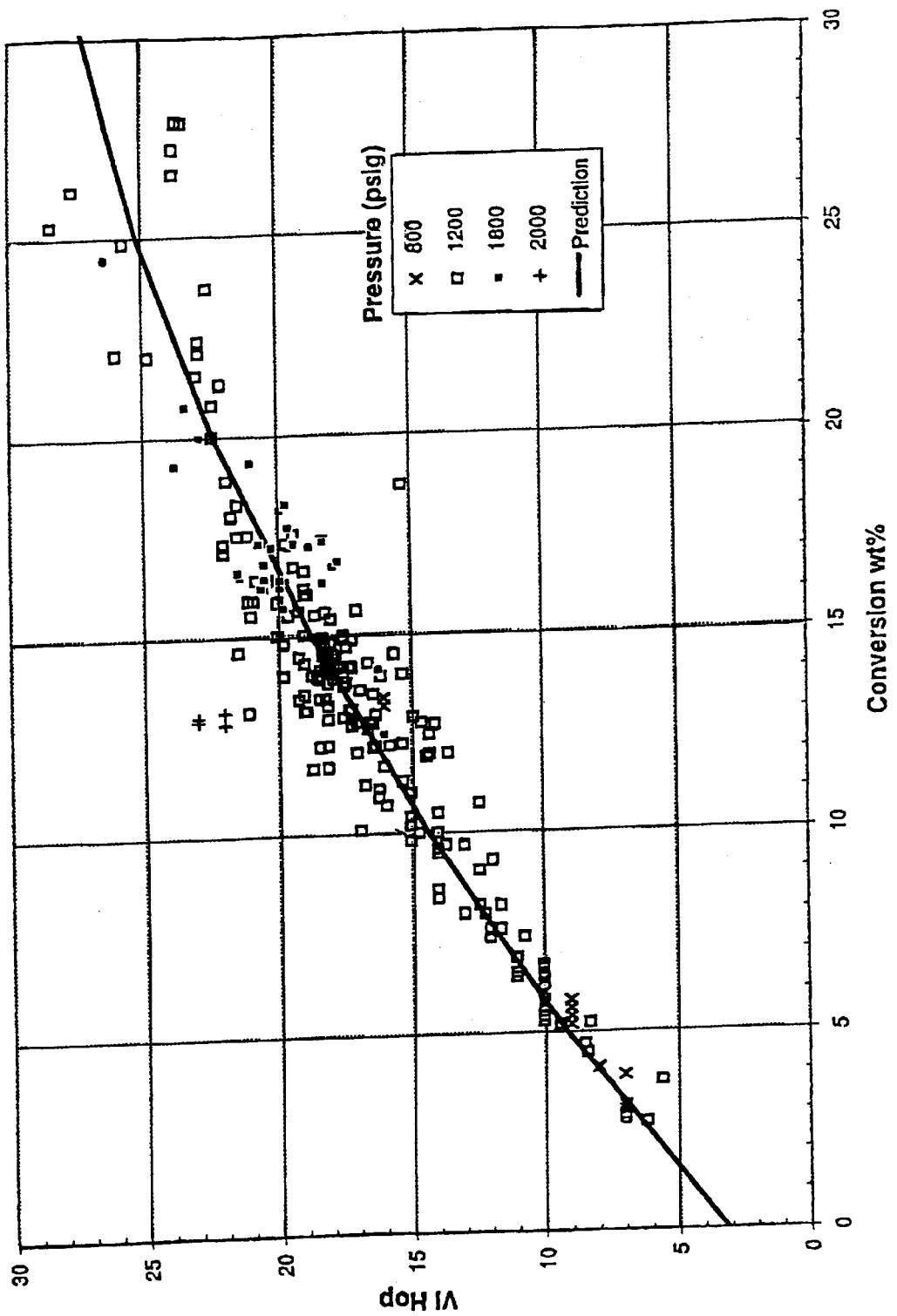
FIG. 3 is a graph showing VI HOP vs. conversion at different pressures.
Figure 4:
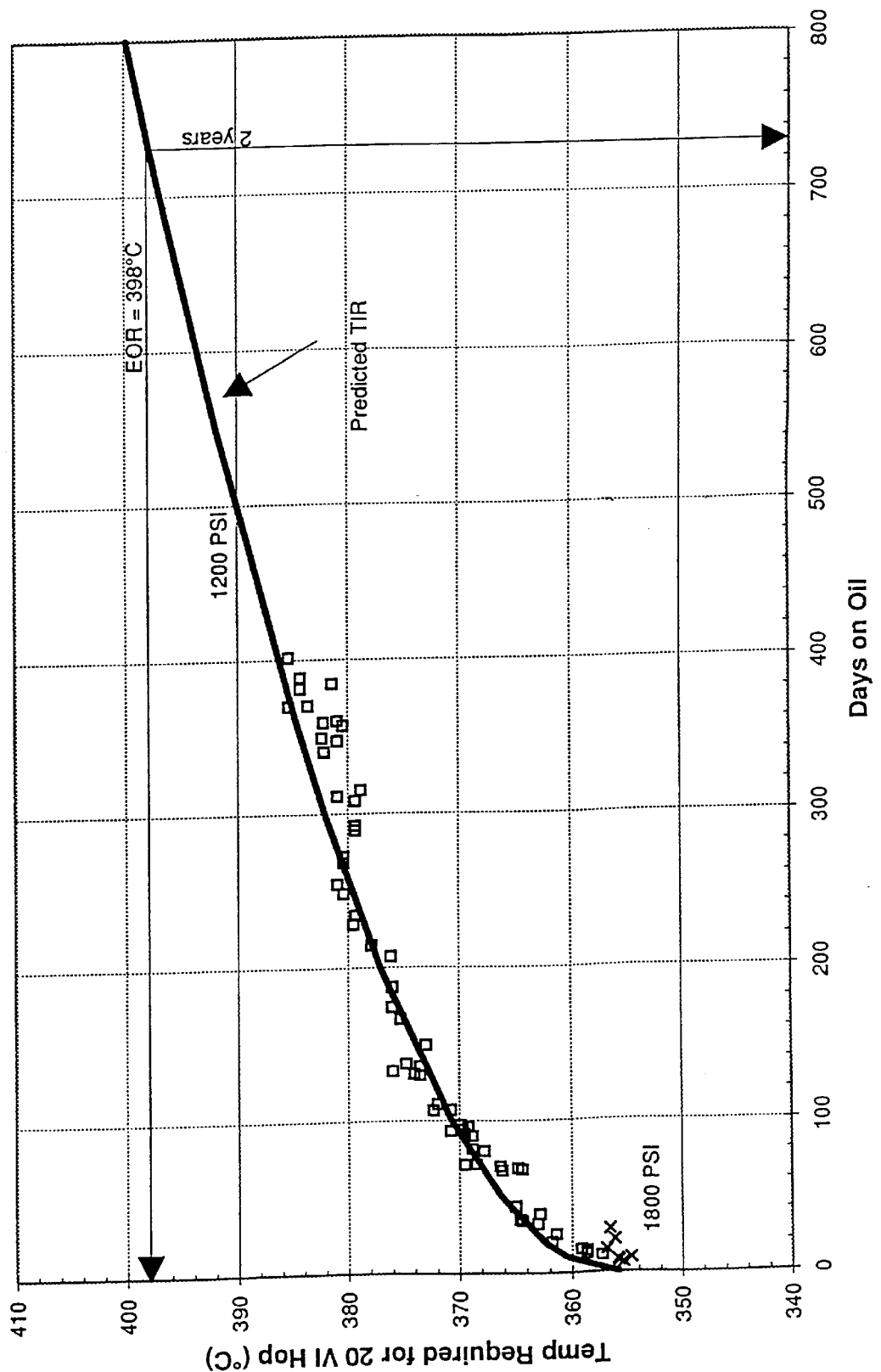
FIG. 4 is a graph showing temperature in the first hydroconversion zone as a function of days on oil at a fixed pressure.

To achieve a basestock viscosity index target, e.g. 110 VI, for a fixed catalyst charge and feed rates, hydroconversion reactor temperature is the primary driver. Temperature sets the conversion (arbitrarily measured here as the conversion to 370° C.-) which is nearly linearly related to the VI increase, irrespective of pressure. This is shown in FIG. 3 relating the VI increase (VI HOP) to conversion. For a fixed pressure, the saturates content of the product depends on the conversion, i.e., the VI achieved, and the temperature required to achieve conversion. At start of run on a typical feed, the temperature required to achieve the target VI may be only 350° C. and the corresponding saturates of the dewaxed oil will normally be in excess of 90 wt. %, for processes operating at or above 1000 psig (7.0 mPa) $H_2$. However, the catalyst deactivates with time such that the temperature required to achieve the same conversion (and the same VI) must be increased. Over a 2 year period, the temperature may increase by 25 to 50° C. depending on the catalyst, feed and the operating pressure. A typical deactivation profile is illustrated in FIG. 4 which shows temperature as a function of days on oil at a fixed pressure. In most circumstances, with process rates of about 1.0 v/v/hr or less and temperatures in excess of 350° C., the saturates associated with the ring species left in the product are determined only by the reactor temperature, i.e., the naphthene population reaches the equilibrium value for that temperature.

Figure 5:
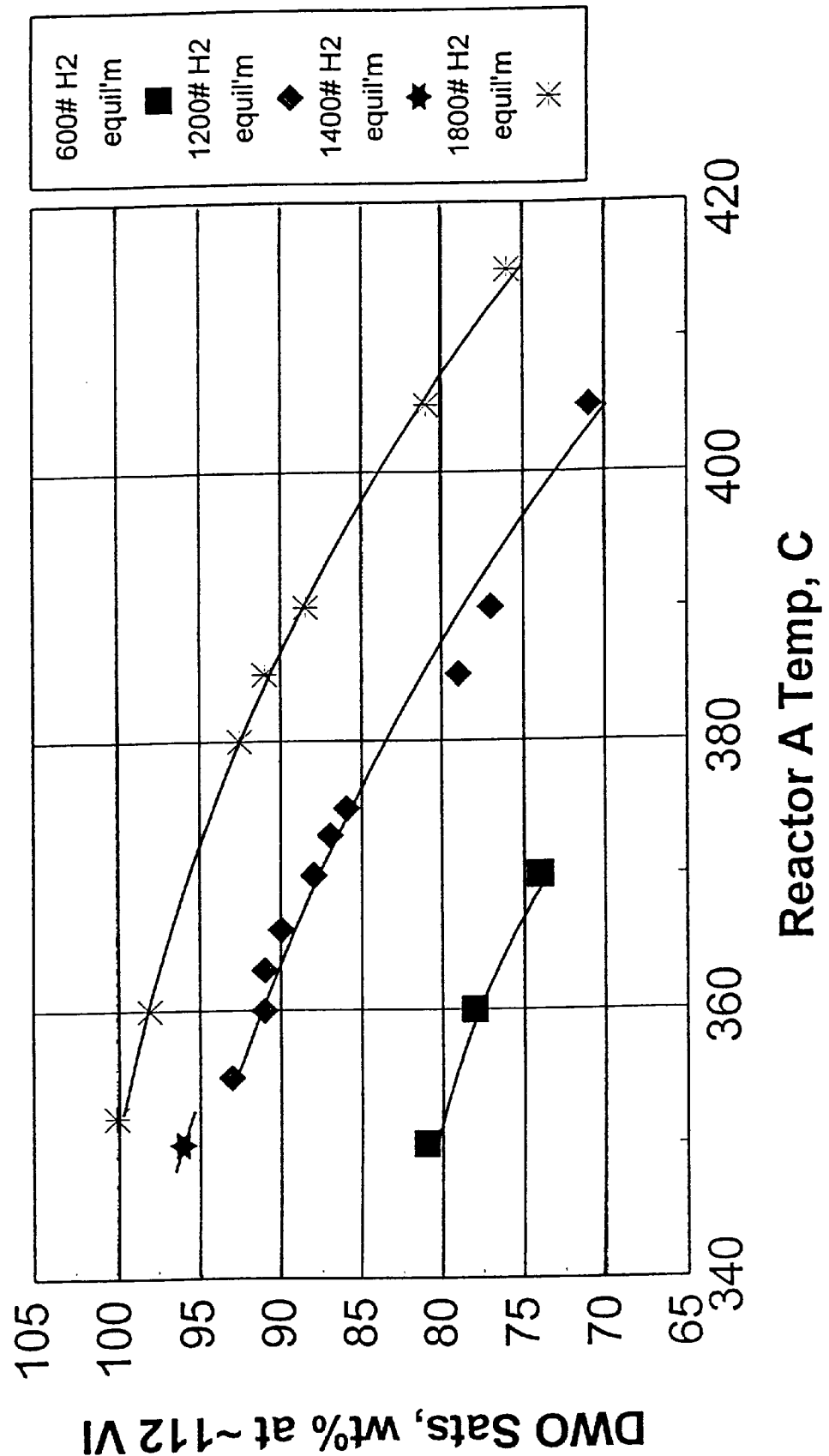
FIG. 5 is a graph showing saturates concentration as a function of reactor temperature for a fixed VI product.

Thus as the reactor temperature increases from about 350° C., saturates will decline along a smooth curve defining a product of fixed VI. FIG. 5 shows three typical curves for a fixed product of 112 VI derived from a 92 VI feed by operating at a fixed conversion. Saturates are higher for a higher pressure process in accord with simple equilibrium considerations. Each curve shows saturates falling steadily with temperatures increasing above 350° C. At 600 psig (4.24 mPa) $H_2$, the process is incapable of simultaneously meeting the VI target and the required saturates (90+ wt. %). The projected temperature needed to achieve 90+ wt. % saturates at 600 psig (4.24 mPa) is well below that which can be reasonably achieved with the preferred catalyst for this process at any reasonable feed rate/catalyst charge. However, at 1000 psig $H_2$ and above, the catalyst can simultaneously achieve 90 wt. % saturates and the target VI.

An important aspect of the invention is that a temperature staging strategy can be applied to maintain saturates at 90+ wt. % for process pressures of 1000 psig (7.0 mPa) $H_2$ or above without disengagement of sour gas and without the use of a polar sensitive hydrogenation catalyst such as massive nickel that is employed in typical hydrocracking schemes. The present process also avoids the higher temperatures and pressures of the conventional hydrocracking process. This is accomplished by separating the functions to achieve VI, saturates and toxicity using a cascading temperature profile over 3 reactors without the expensive insertion of stripping, recompression and hydrogenation steps. API Group II and III basestocks (API Publication 1509) can be produced in a single stage, temperature controlled process.

Figure 6:
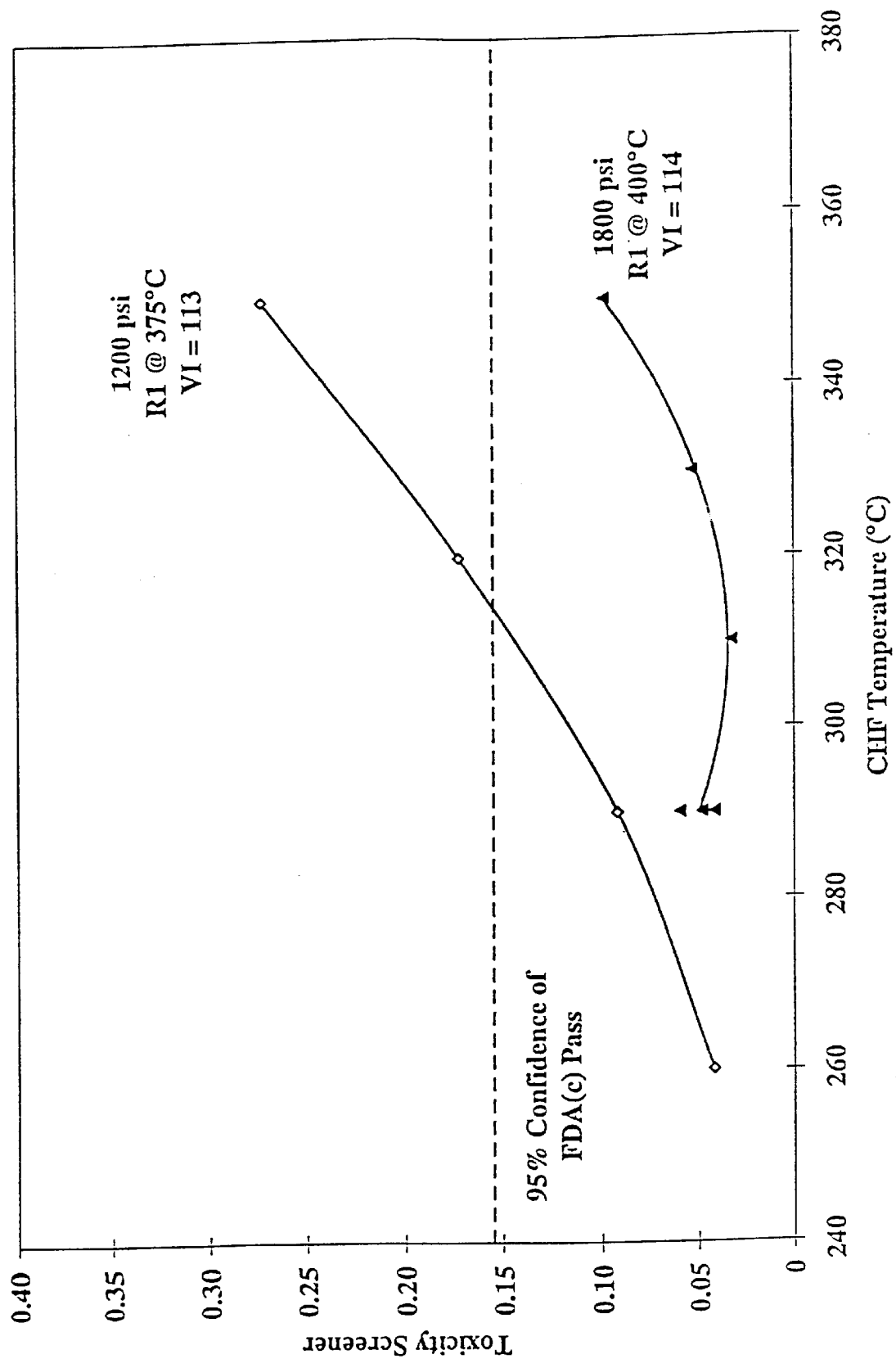
FIG. 6 is a graph showing toxicity as a function of temperature and pressure in the cold hydrofinishing step.

Toxicity of the basestock is adjusted in the cold hydrofinishing step. For a given target VI, the toxicity may be adjusted by controlling the temperature and pressure. This is illustrated in FIG. 6 which shows that higher pressures allows a greater temperature range to correct toxicity.

The invention is further illustrated by the following non-limiting examples.

EXAMPLE 1

This example summarizes functions of each reactor A, B and C. Reactors A and B affect VI though A is controlling. Each reactor can contribute to saturates, but Reactors B and C may be used to control saturates. Toxicity is controlled primarily by reactor C.

TABLE 1

| PRODUCT PARAMETER | Reactor A | Reactor B | Reactor C |
|---|---|---|---|
| VI | x | x | |
| Saturates | | x | x |
| Toxicity | | | x |

EXAMPLE 2

This example illustrates the product quality of oils obtained from the process according to the invention. Reaction conditions and product quality data for start of run (SOR) and end of run (EOR) are summarized in Tables 2 and 3.

As can be seen from the data in Table 2 for the 250N feed stock, reactors A and B operate at conditions sufficient to achieve the desired viscosity index, then, with adjustment of the temperature of reactor C, it is possible to keep saturates above 90 wt. % for the entire run length without compromising toxicity (as indicated by DMSO screener result; see Example 6). A combination of higher temperature and lower space velocity in reactor C (even at end of run conditions in reactors A and B) produced even higher saturates, 96.2%. For a 100N feed stock, end-of-run product with greater than 90% saturates may be obtained with reactor C operating as low as 290C at 2.5 v/v/h (Table 3).

TABLE 2

| Reactor | SOR T (C) | SOR LHSV (v/v/h) | EOR T (C) | EOR LHSV (v/v/h) | EOR T (C) | EOR LHSV (v/v/h) | EOR T (C) | EOR LHSV (v/v/h) |
|---|---|---|---|---|---|---|---|---|
| A | 352 | 0.7 | 400 | 0.7 | 400 | 0.7 | 400 | 0.7 |
| B | 352 | 1.2 | 400 | 1.2 | 400 | 0.2 | 400 | 1.2 |
| C | 290 | 2.5 | 290 | 2.5 | 350 | 2.5 | 350 | 1.0 |

| Dewaxed Oil Properties | 250 N (1) Feed | SOR | EOR | EOR | EOR |
|---|---|---|---|---|---|
| 100 C. Viscosity, cSt | 7.34 | 5.81 | 5.53 | 5.47 | 5.62 |
| 40 C. Viscosity, cSt | 54.41 | 34.28 | 31.26 | 30.63 | 32.08 |
| Viscosity Index | 93 | 111 | 115 | 115 | 114 |
| Pour point, C. | −18 | −18 | −16 | −18 | −19 |
| Saturates, wt. % | 58.3 | 100 | 85.2 | 91 | 96.2 |
| DMSO Screener for toxicity (2) | 0.30 | 0.02 | 0.06 | 0.10 | 0.04 |
| 370 C.+ Yield, wt. on raffinate feed | 100 | 87 | 81 | 81 | 82 |

*Other Conditions: 1800 psig (12.5 mPa) H2 inlet pressure, 2400 SCF/B (427 m3/m3)
1) 93 VI under extracted feed
2) Maxiumum ultra-violet absorbance at 340 to 350 nm.

TABLE 3

| Reactor | SOR T (C) | SOR LHSV (v/v/h) | EOR T (C) | EOR LHSV (v/v/h) |
|---|---|---|---|---|
| A | 355 | 0.7 | 394 | 0.7 |
| B | 355 | 1.2 | 394 | 1.2 |
| C | 290 | 2.5 | 290 | 2.5 |

| Dewaxed Oil Properties | 100 N (1) Feed | SOR | EOR |
|---|---|---|---|
| 100 C. Viscosity, cSt | 4.35 | 3.91 | 3.83 |
| 40 C. Viscosity, cSt | 22.86 | 18.23 | 17.36 |
| Viscosity Index | 95 | 108 | 112 |
| Pour Point, C. | −18 | −18 | −18 |
| Saturates, wt. % | 64.6 | 99 | 93.3 |
| DMSO Screener for toxicity (2) | 0.25 | 0.01 | 0.03 |
| 370 C.+ Yield, wt. % on raffinate feed | 93 | 80 | 75 |

*Other Conditions: 1800 psig (12.5 mPa) H2 inlet pressure, 2400 SCF/B (427 m3/m3)
1) 95 VI under extracted feed
2) Maximum ultra-violet absorbane at 340 to 350 nm.

EXAMPLE 3

The effect of temperature and pressure on the concentration of saturates (dewaxed oil) at constant VI is shown in this example for processing the under extracted 250N raffinate feed. Dewaxed product saturates equilibrium plots (FIG. 5) were obtained at 600, 1200 and 1800 psig (4.24, 8.38 and 12.5 mPa) H2 pressure. Process conditions were 0.7 LHSV (reactor A+B) and 1200 to 2400 SCF/B (214 to 427 m³/m³). Both reactors A and B were operating at the same temperature (in the range 350 to 415° C.).

As can be seen from the figure it is not possible to achieve 90 wt. % saturates at 600 psig (4.14 mPa) hydrogen partial pressure. While in theory, one could reduce the temperature to reach the 90 wt. % target, the space velocity would be impractically low. The minimum pressure to achieve the 90 wt. % at reasonable space velocities is about 1000 psig (7.0 mPa). Increasing the pressure increases the temperature range which may be used in the first two reactors (reactor A and B). A practical upper limit to pressure is set by higher cost metallurgy typically used for hydrocrackers, which the process of the invention can avoid.

EXAMPLE 4

The catalyst deactivation profile as reflected by temperature required to maintain product quality is shown in this example. FIG. 4 is a typical plot of isothermal temperature (for reactor A, no reactor B) required to maintain a VI increase of 18 points versus time on stream. KF840 catalyst was used for reactors A and C. Over a two year period, reactor A temperatures could increase by about 50° C. This will affect the product saturates content. Strategies to offset a decline in product saturates as reactor A temperature is increased are shown below.

EXAMPLE 5

This example demonstrates the effect of temperature staging between the first (reactor A) and second (reactor B) hydroconversion units to achieve the desired saturates content for a 1400 psig (9.75 mPa) $H_2$ process with a 93 VI raffinate feed.

TABLE 4

| | Reactor Sequence: | | | |
|---|---|---|---|---|
| | Base Case | | Temperature Staged Case | |
| Reactor | T (C) | LHSV (v/v/h) | T (C) | LHSV (v/v/h) |
| A | 390 | 0.7 | 390 | 0.7 |
| B | 390 | 1.2 | 350 | 0.5 |
| C | 290 | 2.5 | 290 | 2.5 |
| Dewaxed Oil Viscosity Index | 114 | | 115 | |
| Dewaxed Oil Saturates, wt. % | 80 | | 96 | |

A comparison of the base case versus the temperature staged case demonstrates the merit of operating reactor B at lower temperature and space velocities. The bulk saturates content of the product was restored to the thermodynamic equilibrium at the temperature of reactor B.

EXAMPLE 6

Figure 8:
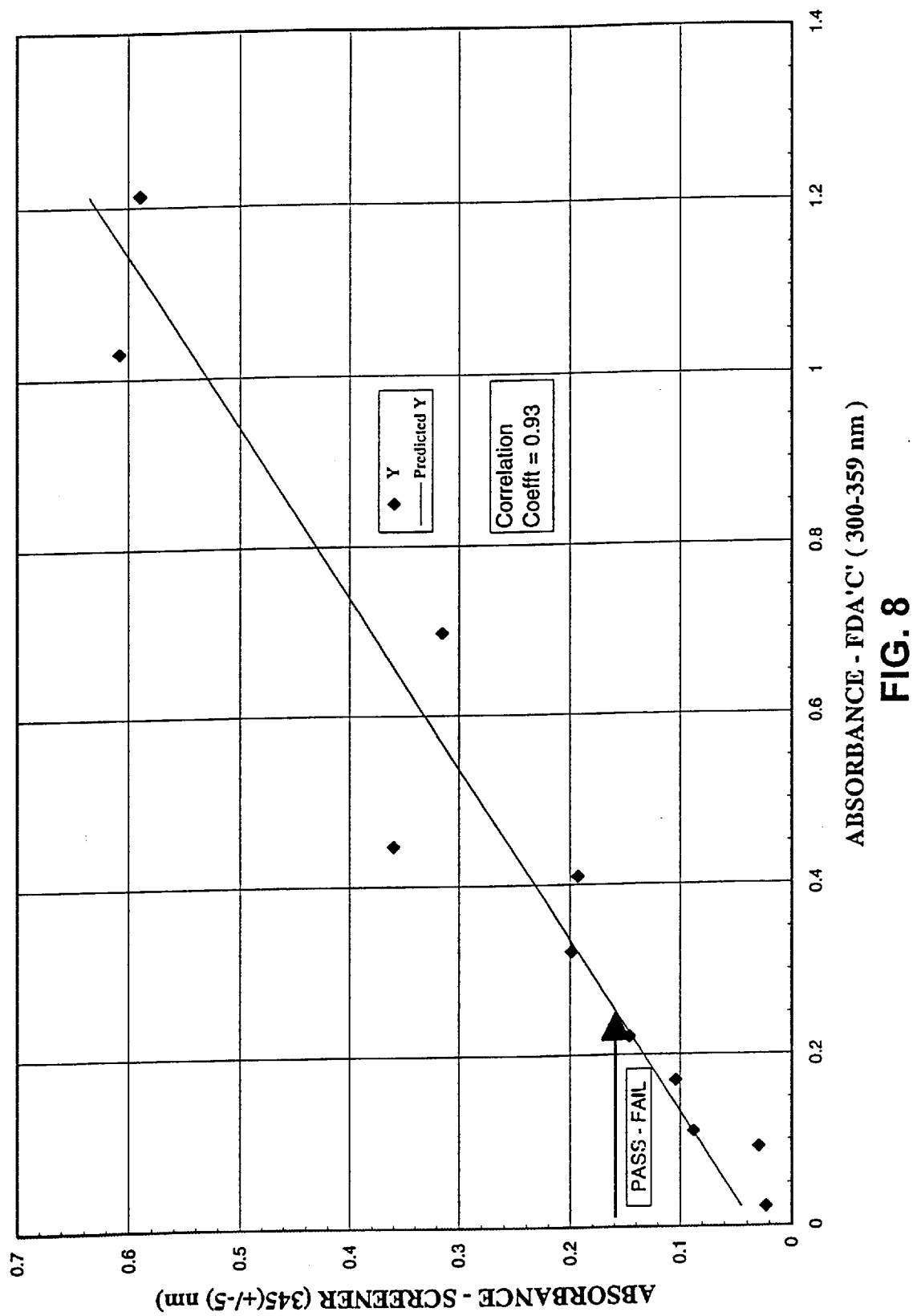
FIG. 8 is a graph showing the correlation between the DMSO screener test and the FDA (c) test.

The effects of temperature and pressure in the cold hydrofinishing unit (reactor C) on toxicity are shown in this example. The toxicity is estimated using a dimethyl sulphoxide (DMSO) based screener test developed as a surrogate for the FDA (c) test. The screener and the FDA (c) test are both based on the ultra-violet spectrum of a DMSO extract. The maximum absorbance at 345+/−5 nm in the screener test was shown to correlate well with the maximum absorbance between 300–359 nm in the FDA (c) test as shown in FIG. 8. The upper limit of acceptable toxicity using the screener test is 0.16 absorbance units. As shown in FIG. 6, operating at 1800 psig (12.7 Mpa) versus 1200 psig (8.38 Mpa) hydrogen partial pressure allows the use of a much broader temperature range (e.g. 290 to ~360° C. versus a maximum of only about 315° C. when operating at 1200 psig $H_2$ (8.35 Mpa)) in the cold hydrofinisher to achieve a non-toxic product. The next example demonstrates that higher saturates, non-toxic products can be made when reactor C is operated at higher temperature.

EXAMPLE 7

This example is directed to the use of the cold hydrofinishing (reactor C) unit to optimize saturates content of the oil product. Reactors A and B were operated at 1800 psig (12.7 mPa) hydrogen partial pressure, 2400 Scf/B (427 m³/m³) treat gas rate, 0.7 and 1.2 LHSV respectively and at a near end-of-run (EOR) temperature of 400° C. on a 92 VI 250N raffinate feed. The effluent from reactors A and B contains just 85% saturates. Table 5 shows the conditions used in reactor C needed to render a product that is both higher saturates content and is non-toxic. At 350° C., reactor C can achieve 90+% saturates even at space velocities of 2.5 v/v/hr. At lower LHSV, saturates in excess of 95% are achieved.

TABLE 5

| | RUNS | | | |
|---|---|---|---|---|
| Run No. | 1 | 2 | 3 | 4 |
| Temperature, C. | 290 | 330 | 350 | 350 |
| LHSV, v/v/hr | 2.5 | 2.5 | 2.5 | 1.0 |
| H2 Press, psig | 1800 | 1800 | 1800 | 1800 |
| Treat Gas Rate, SCF/B | 2400 | 2400 | 2400 | 2400 |
| DWO VI | 115 | 114 | 115 | 114 |
| DWO Saturates, wt. % | 85 | 88 | 91 | 96 |
| DMSO Screener for Toxicity (1) | 0.06 | 0.05 | 0.10 | 0.04 |

1) Maximum ultra-violet absorbance at 340–350 nm

Figure 7:
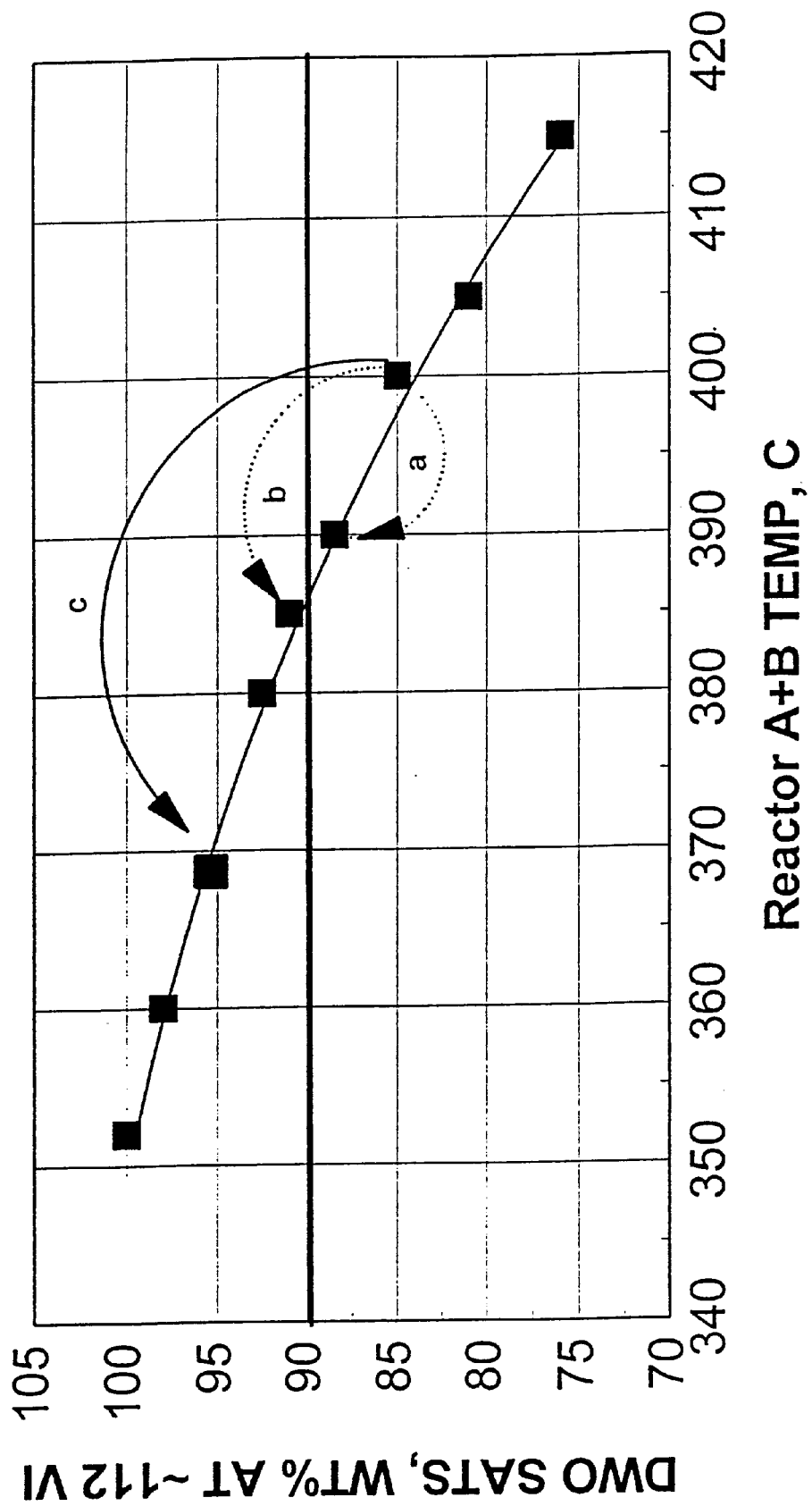
FIG. 7 is a graph showing control of saturates concentration by varying conditions in the cold hydrofinishing step.

FIG. 7 further illustrates the flexible use of reactor C. As shown in FIG. 7, optimization of reactor C by controlling temperature and space velocity gives Group II basestocks

EXAMPLE 8

This example demonstrates that feeds in addition to raffinates and dewaxed oils can be upgraded to higher quality basestocks. The upgrading of low value foots oil streams is shown in this example. Foots oil is a waxy by-product stream from the production of low oil content finished wax. This material can be used either directly or as a feed blendstock with under extracted raffinates or dewaxed oils. In the example below (Table 6), foots oil feeds were upgraded at 650 psig (4.58 mPa) $H_2$ to demonstrate their value in the context of this invention. Reactor C was not included in the processing. Two grades of foots oil, a 500N and 150N, were used as feeds.

TABLE 6

| | 500 N | | 150 N | |
|---|---|---|---|---|
| | Feed | Product | Feed | Product |
| Temperature, ° C. (Reactor A/B) | — | 354 | — | 354 |
| Treat Gas rate (TGR), Scf/B, (m³/m³) | — | 500 (89) | — | 500 (89) |
| Hydrogen partial pressure, psig (mPa) | — | 650 (4.58) | — | 650 (4.58) |
| LHSV, v/v/hr (Reactor A + B) | — | 1.0 | — | 1.0 |
| wt. % 370° C. - on feed | 0.22 | 3.12 | 1.10 | 2.00 |
| 370° C.+ DWO Inspections | | | | |
| 40° C. viscosity, cSt | 71.01 | 48.80 | 25.01 | 17.57 |
| 100° C. viscosity, cSt | 8.85 | 7.27 | 4.77 | 4.01 |
| VI/Pour Point, ° C. | 97/−15 | 109/−17[(2)] | 111/−8 | 129/−9[(2)] |
| Saturates, wt. % | 73.4 | 82.8[(1)] | 79.03 | 88.57[(1)] |
| GCD NOACK, wt. % | 4.2 | 8.0 | 19.8 | 23.3 |
| Dry Wax, wt. % | 66.7 | 67.9 | 83.6 | 83.3 |
| DWO Yield, wt. % of Foots Oil Feed | 33.2 | 31.1 | 16.2 | 15.9 |

[(1)]Saturates improvement will be higher at higher hydrogen pressures
[(2)]Excellent blend stock Table 6 shows that both a desirable basestock with significantly higher VI and saturates content and a valuable wax product can be recovered from foots oil. In general, since wax molecules are neither consumed or formed in this process, inclusion of foots oil streams as feed blends provides a means to recover the valuable wax while improving the quality of the resultant base oil product.

EXAMPLE 9

This example illustrates the advantage of catalytic trim dewaxing a solvent dewaxed hydrotreated raffinate. The trim catalytic dewaxed products, even though they have lower VI, have much better low temperature properties (products as defined by lower Brookfield Viscosity) than the corresponding solvent dewaxed feed. Trim dewaxing refers to the process of solvent dewaxing followed by catalytic dewaxing.

A raffinate product made under the conditions in Table 7 was topped at 370° C. to give a 370° C.+ product which was solvent dewaxed using MIBK in a 3:1 solvent to raffinate product ratio and a filter temperature of −21° C. to make a dewaxed oil having the properties shown in Table 8.

TABLE 7

| Process Conditions | |
|---|---|
| R1 Conditions | |
| Pressure, psig | 1800 (12.4 mPa) |
| TGR, scf/B | 2500 (445 m³/m³) |
| Space Velocity, v/v/h | 0.7 |
| Temperature, ° C. | 375 |
| R2 Conditions | |
| Pressure, psig | 1800 |
| TGR, scf/B | 2400 (427 m³/m³) |
| Space Velocity, v/v/h | 2.5 |
| Temperature, ° C. | 290 |

TABLE 8

| Product Properties | |
|---|---|
| Viscosity, cSt at 100° C., | 4.182 |
| Viscosity, cSt at 40° C., | 20.495 |
| SUS, cP at 100° F. | 107.7 |
| VI | 106 |
| Pour Point, ° C. | −19 |
| Brookfield Viscosity, at −40° C. | 39900 |

This dewaxed oil was then catalytically dewaxed over a 0.5 wt % Pt TON (zeolite)/Pt Silica-alumina (25:75 wt/wt, zeolite: silica-alumina) mixed powder composite catalyst under the conditions shown in Table 9 and to produce the products, after fractionation at 370° C., shown in Table 9.

TABLE 9

| Process Conditions | | |
|---|---|---|
| Pressure, psig | 1000 | 1000 |
| TGR, scf/B | 2500 | 2500 |
| Space Velocity, v/v/h | 1.0 | 1.0 |
| Temperature, ° C. | 295 | 303 |
| Yield, wt. % | 67 | 60 |
| Product Properties | | |
| Viscosity, cSt at 100° C., | 4.150 | 4.122 |
| Viscosity, cSt at 40° C., | 20.634 | 20.441 |
| SUS, cP at 100° F. | 108.4 | 107.5 |
| VI | 101.7 | 101.3 |
| Pour Point, ° C. | −33 | −40 |
| Brookfield Viscosity, cP at −40° C. | 32100 | 22900 |

The dewaxed oils, both feed and products from the catalytic dewaxer were formulated as Automatic Transmission Fluids using a Ford type ATF ad pack (22 wt % treat rate of ATF ad pack, 78 wt % dewaxed oil) and Brookfield Viscosities at −40° C. measured. The Brookfield Viscosities for both feed and products are shown in Tables 8 and 9 respectively.

EXAMPLE 10

This example illustrates the advantage of catalytic dewaxing a total liquid product produced from hydrotreating a raffinate over the process described in Example 9. Catalytic dewaxing is shown to give a product with improved VI over that obtained by solvent dewaxing at the same pour points. In addition, the catalytic dewaxed products have much better low temperature properties (as defined by lower Brookfield Viscosity) than the corresponding solvent dewaxed product.

A hydrotreated raffinate product was made under the conditions listed in Table 10.

TABLE 10

| Process Conditions | |
| --- | --- |
| R1 Conditions | |
| Pressure, psig | 1800 (12.4 mPa) |
| TGR, scf/B | 2400 (427 m³/m³) |
| Space Velocity, v/v/h | 0.7 |
| Temperature, ° C. | 382 |
| R2 Conditions | |
| Pressure, psig | 1800 |
| TGR, scf/B | 2400 |
| Space Velocity, v/v/h | 2.5 |
| Temperature, ° C. | 290 |

The hydrotreated raffinate total liquid product made under the conditions in Table 10 was topped at 370° C. to give a 370° C.+ product which was solvent dewaxed using MIBK in a 3:1 solvent to raffinate product ratio and a filter temperature of −21° C. to make a dewaxed oil having the properties shown in Table 11

TABLE 11

| Product Properties | |
| --- | --- |
| Viscosity, cSt at 100° C., | 3.824 |
| Viscosity, cSt at 40° C., | 17.5 |
| SUS, cP at 100° F. | 93.5 |
| VI | 109.3 |
| Pour Point, ° C. | −19 |
| Yield on TLP, wt. % | 65.5 |
| Brookfield Viscosity, cP at −40° C. | 26800 |

The total liquid product from this step was then catalytically dewaxed over a 0.5 wt % Pt TON (zeolite)/Pt Silica-alumina (25:75 wt/wt, zeolite: silica-alumina) mixed powder composite catalyst under the conditions shown in Table 12 and to produce the products, after topping at 370° C., shown in Table 11.

TABLE 12

| Process Conditions | | | |
| --- | --- | --- | --- |
| Pressure, psig | 1000 | 1000 | 1000 (7.0 mPa) |
| TGR, scf/B | 2500 | 2500 | 2500 (445 m³/m³) |
| Space Velocity, v/v/h | 1.0 | 1.0 | 1.0 |
| Temperature, ° C. | 304 | 306 | 314 |
| Yield, wt. % | 48.2 | 46.3 | 33.5 |
| Product Properties | | | |
| Viscosity, cSt at 100° C., | 3.721 | 3.672 | 3.593 |
| Viscosity, cSt at 40° C., | 16.511 | 16.256 | 15.925 |
| SUS, cP at 100° F. | 89.0 | 87.8 | 86.4 |
| VI | 112.6 | 111 | 107.0 |
| Pour Point, ° C. | −20 | −23 | −39 |
| Brookfield Viscosity, at −40° C. | 13640 | 12740 | 10600 |

The dewaxed oils, both solvent dewaxed and the products from the catalytic dewaxer, were formulated as Automatic Transmission Fluids using a Ford type ATF ad pack (22 wt % treat rate of ATF ad pack, 78 wt % dewaxed oil) and Brookfield Viscosities at −40° C. measured. The Brookfield Viscosities for both feed and products are shown in Tables 5 and 6 respectively.

Figure 9:
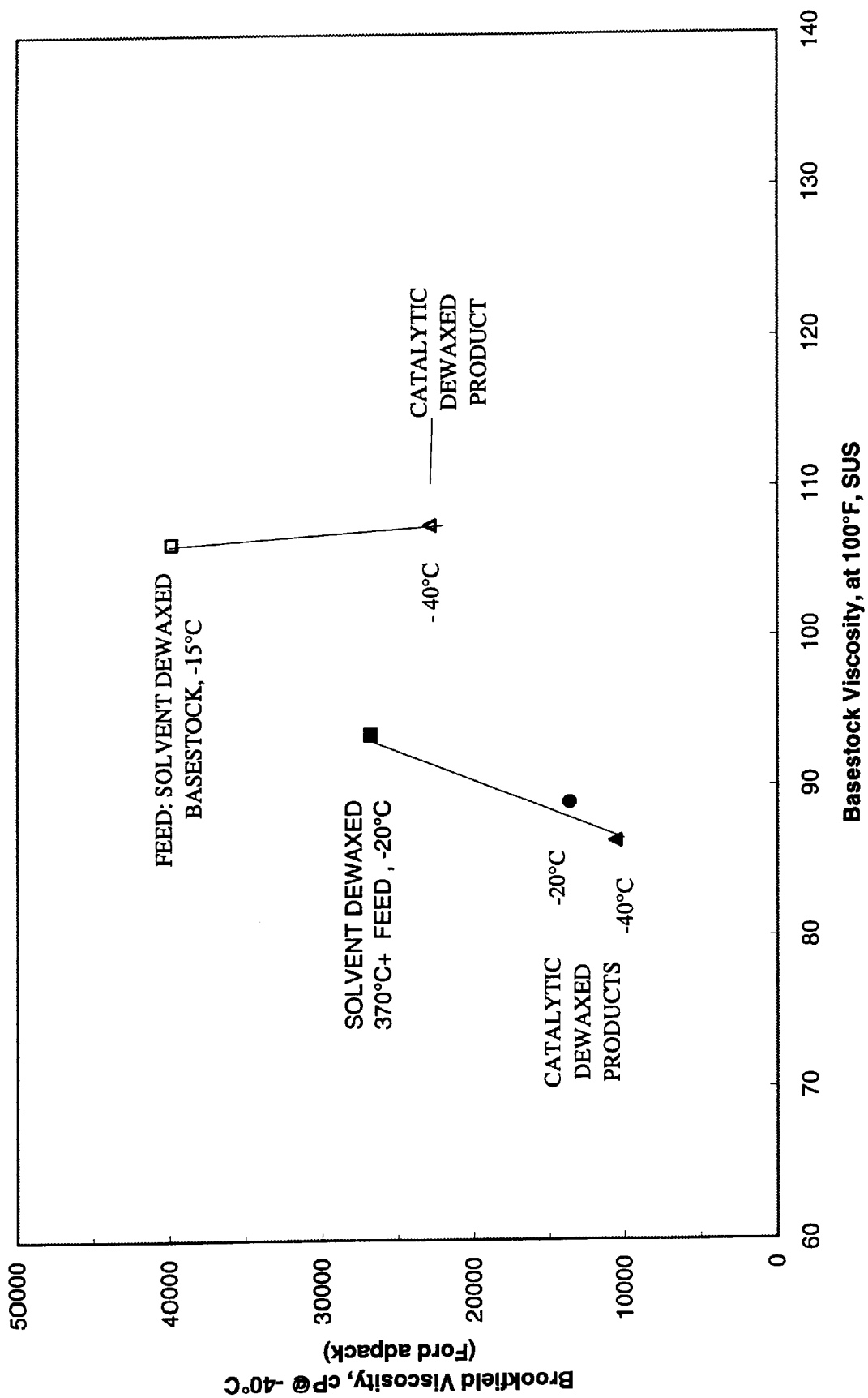
FIG. 9 is a graph showing the catalytic dewaxing of dewaxed oil and total liquid products.

FIG. 9 shows the benefit of catalytic dewaxing both the DWO and total liquid products. Comparing the data in Examples 9 and 11 (Tables 9 and 12) shows a further benefit for dewaxing a TLP vs. a DWO in that the former results in products having a higher VI at the same pour point. Catalytic dewaxing also improves the VI of the products from dewaxing a TLP over that obtained by solvent dewaxing.

EXAMPLE 11

This example further illustrates the advantage of catalytic dewaxing a total liquid product versus solvent dewaxing to the same pour point. Catalytic dewaxing is shown to give a product with improved VI over that obtained by solvent dewaxing at the same pour points. In addition, the catalytic dewaxed products have much better low temperature properties (as defined by lower Brookfield Viscosity) than the corresponding solvent dewaxed product.

A hydrotreated raffinate product was made under the conditions listed in Table 10.

TABLE 13

| Process Conditions | |
| --- | --- |
| R1 Conditions | |
| Pressure, psig | 1800 (12.5 mPa) |
| TGR, scf/B | 2400 (427 m³/m³) |
| Space Velocity, v/v/h | 0.7 |
| Temperature, ° C. | 382 |
| R2 Conditions | |
| Pressure, psig | 1800 |
| TGR, scf/B | 2400 |
| Space Velocity, v/v/h | 2.5 |
| Temperature, ° C. | 290 |

The hydrotreated raffinate total liquid product made under the conditions in Table 4 was topped at 370° C. to give a 370° C.+ product which was solvent dewaxed using MIBK in a 3:1 solvent to raffinate product ratio and a filter temperature of −21° C. to make a dewaxed oil having the properties shown in Table 14.

TABLE 14

| Product Properties | |
| --- | --- |
| Viscosity, cSt at 100° C., | 5.811 |
| Viscosity, cSt at 40° C., | 34.383 |
| SUS, cP at 100° F. | 177 |
| VI | 110.6 |
| Pour Point, ° C. | −21 |
| Yield on TLP, wt. % | 64.6 |
| Brookfield Viscosity, cP at −40° C. | 148200 |

The total liquid product from this step was then catalytically dewaxed over a 0.5 wt % Pt TON (zeolite)/Pt Silica-alumina (25:75 wt/wt, zeolite: silica-alumina) mixed powder composite catalyst under the conditions shown in Table 15 and to produce the products, after topping at 370° C., shown in Table 11.

TABLE 15

| Process Conditions | | | |
|---|---|---|---|
| Pressure, psig | 1000 | 1000 | 1000 |
| TGR, scf/B | 2500 | 2500 | 2500 |
| Space Velocity, v/v/h | 1.0 | 1.0 | 1.00 |
| Temperature, °C. | 304 | 306 | 314 |
| Yield, wt. % | 48.2 | 46.3 | 33.5 |
| Product Properties | | | |
| Viscosity, cSt at 100° C., | 5.309 | 5.261 | 5.115 |
| Viscosity, cSt at 40° C., | 28.899 | 28.552 | 27.364 |
| SUS, cP at 100° F. | 148.9 | 147.2 | 141.2 |
| VI | 117.6 | 117.0 | 116.4 |
| Pour Point, °C. | −13 | −20 | −18 |
| Brookfield Viscosity, at −40° C. | 47150 | 35650 | 38150 |

The dewaxed oils, both solvent dewaxed and the products from the catalytic dewaxer, were formulated as Automatic Transmission Fluids using a Ford type ATF ad pack (22 wt % treat rate of ATF ad pack, 78 wt % dewaxed oil) and Brookfield Viscosities at −40° C. measured. The Brookfield Viscosities for both feed and products are shown in Tables 14 and 15 respectively.

Figure 10:
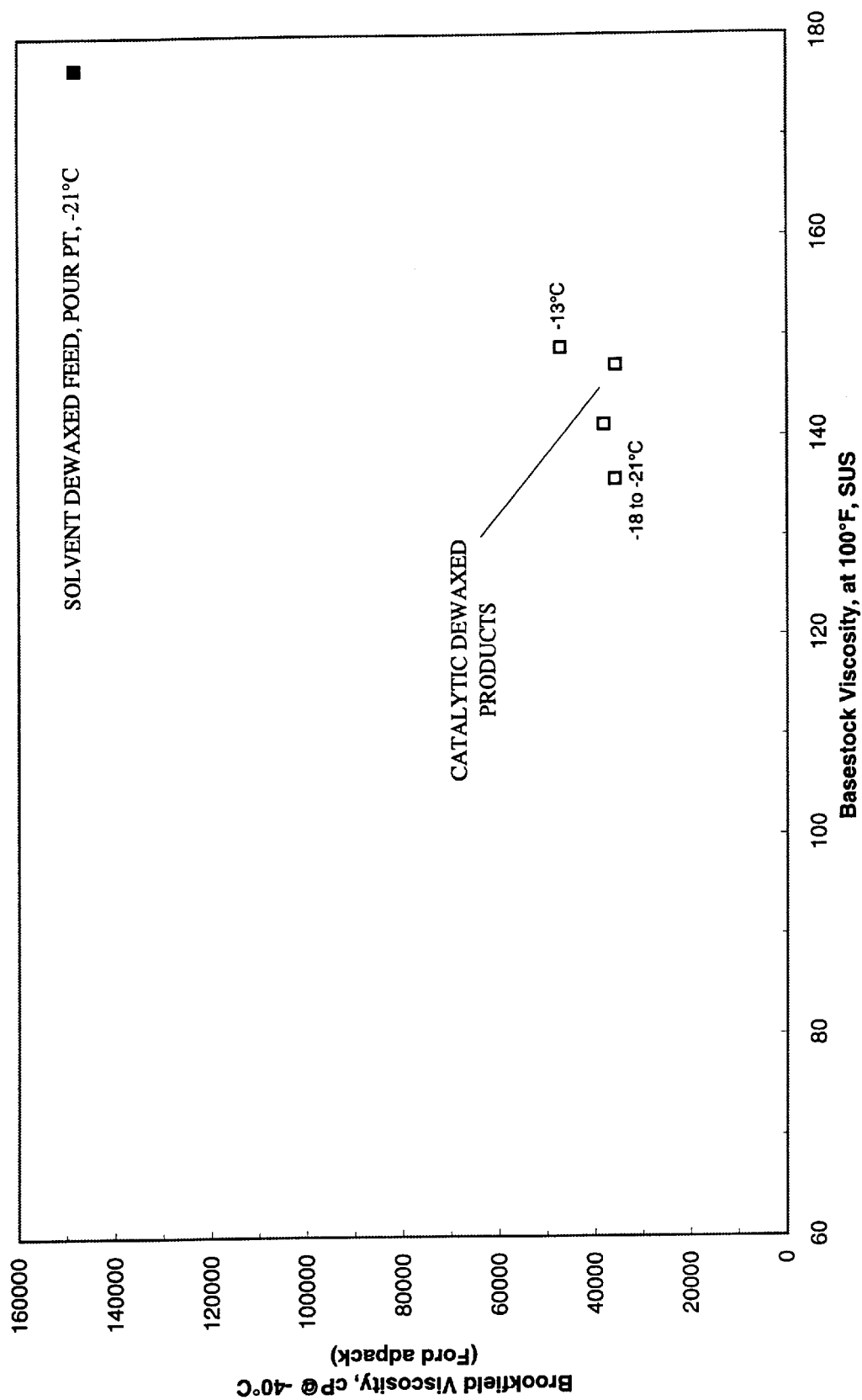
FIG. 10 is a graph showing the comparison catalytic dewaxing a total liquid product vs. solvent dewaxing to the same pour point.

FIG. 10 is a graphical illustration of the results from Example 11. This example also illustrates the benefit of catalytic dewaxing versus solvent dewaxing in that the VI of the products from catalytic dewaxing are higher than that obtained by solvent dewaxing.

What is claimed is:

1. A process for producing a lubricating oil basestock meeting at least 90 wt. % saturates by selectively hydroconverting a raffinate produced from solvent refining a lubricating oil feedstock which comprises:
   (a) conducting the lubricating oil feedstock to a solvent extraction zone and separating therefrom an aromatics rich extract and a paraffins rich raffinate;
   (b) stripping the raffinate of solvent to produce a raffinate feed having a dewaxed oil viscosity index from about 85 to about 105 and a final boiling point of no greater than about 650° C.;
   (c) passing at least a portion of the raffinate feed to a first hydroconversion zone and processing the raffinate feed in the presence of a non-acidic hydroconversion catalyst at a temperature of from 340 to 420° C., a hydrogen partial pressure of from 1000 to 2500 psig, space velocity of 0.2 to 3.0 LHSV and a hydrogen to feed ratio of from 500 to 5000 Scf/B to produce a first hydroconverted raffinate;
   (d) passing the hydroconverted raffinate from the first hydroconversion zone to a second hydroconversion zone and processing the hydroconverted raffinate in the presence of a non-acidic hydroconversion catalyst at a temperature of from 340 to 400° C. provided that the temperature in second hydroconversion is not greater than the temperature in the first hydroconversion zone, a hydrogen partial pressure of from 1000 to 2500 psig, a space velocity of from 0.2 to 3.0 LHSV and a hydrogen to feed ratio of from 500 to 5000 Scf/B to produce a second hydroconverted raffinate;
   (e) passing the second hydroconverted raffinate to a hydrofinishing zone and conducting cold hydrofinishing of the second hydroconverted raffinate in the presence of a hydrofinishing catalyst at a temperature of from 260 to 360° C., a hydrogen partial pressure of from 1000 to 2500 psig, a space velocity of from 0.2 to 5 LHSV and a hydrogen to feed ratio of from 500 to 5000 Scf/B to produce a hydrofinished raffinate;
   (f) passing the hydrofinished raffinate to a separation zone to remove products having a boiling less than about 250° C.; and
   (g) passing the hydrofinished raffinate from step (f) to a dewaxing zone and catalytically dewaxing the hydrofinished raffinate under catalytic dewaxing conditions in the presence of hydrogen and a catalytic dewaxing catalyst comprising a metal hydrogenation component and a crystalline 10 or 12 ring molecular sieve.

2. A process for selectively hydroconverting a raffinate produced from solvent refining a lubricating oil feedstock which comprises:
   (a) conducting the lubricating oil feedstock to a solvent extraction zone and separating therefrom an aromatics rich extract and a paraffins rich raffinate;
   (b) stripping the raffinate of solvent to produce a raffinate feed having a dewaxed oil viscosity index from about 85 to about 105 and a final boiling point of no greater than about 650° C.;
   (c) passing at least a portion of the raffinate feed to a first hydroconversion zone and processing the raffinate feed in the presence of a non-acidic hydroconversion catalyst at a temperature of from 340 to 420° C., a hydrogen partial pressure of from 1000 to 2500 psig, space velocity of 0.2 to 3.0 LHSV and a hydrogen to feed ratio of from 500 to 5000 Scf/B to produce a first hydroconverted raffinate;
   (d) passing the hydroconverted raffinate from the first hydroconversion zone to a second hydroconversion zone and processing the hydroconverted raffinate in the presence of a non-acidic hydroconversion catalyst at a temperature of from 340 to 400° C. provided that the temperature in the second hydroconversion is not greater than the temperature in the first hydroconversion zone, a hydrogen partial pressure of from 1000 to 2500 psig, a space velocity of from 0.2 to 3.0 LHSV and a hydrogen to feed ratio of from 500 to 5000 Scf/B to produce a second hydroconverted raffinate;
   (e) passing the second hydroconverted raffinate to a hydrofinishing reaction zone and conducting cold hydrofinishing of the second hydroconverted raffinate in the presence of a hydrofinishing catalyst at a temperature of from 260 to 360° C., a hydrogen partial pressure of from 1000 to 2500 psig, a space velocity of from 0.2 to 5 LHSV and hydrogen to feed ratio of from 500 to 5000 Scf/B to produce a hydrofinished raffinate;
   (f) solvent dewaxing the hydrofinsihed raffinate under solvent dewaxing conditions to obtain a dewaxed oil having a pour point less than about 10° C.; and
   (g) catalytically dewaxing the solvent dewaxed oil under catalytic dewaxing conditions in the presence of hydrogen and a catalytic dewaxing catalyst comprising a metal hydrogenation component and a crystalline 10 or 12 ring molecular sieve to produce a dewaxed lubricating oil basestock.

3. A process for producing a lubricating oil basestock meeting at least 90 wt. % saturates by selectively hydroconverting a raffinate produced from solvent refining a lubricating oil feedstock which comprises:
   (a) conducting the lubricating oil feedstock to a solvent extraction zone and separating therefrom an aromatics rich extract and a paraffins rich raffinate;
   (b) stripping the raffinate of solvent to produce a raffinate feed having a dewaxed oil viscosity index from about 85 to about 105 and a final boiling point of no greater than about 650° C.;
   (c) passing at least a portion of the raffinate feed to a first hydroconversion zone and processing the raffinate feed in the presence of a non-acidic hydroconversion catalyst at a temperature of from 340 to 420° C., a hydrogen partial pressure of from 1000 to 2500 psig, space velocity of 0.2 to 3.0 LHSV and a hydrogen to feed ratio of from 500 to 5000 Scf/B to produce a first hydroconverted raffinate;

(d) passing the hydroconverted raffinate from the first hydroconversion zone to a second hydroconversion zone and processing the hydroconverted raffinate in the presence of a non-acidic hydroconversion catalyst at a temperature of from 340 to 400° C. provided that the temperature in second hydroconversion is not greater than the temperature in the first hydroconversion zone, a hydrogen partial pressure of from 1000 to 2500 psig, a space velocity of from 0.2 to 3.0 LHSV and a hydrogen to feed ratio of from 500 to 5000 Scf/B to produce a second hydroconverted raffinate;

(e) passing the second hydroconverted raffinate to a separation zone to remove products having a boiling less than about 250° C.;

(f) passing the hydroconverted raffinate from step (e) to a dewaxing zone and catalytically dewaxing the hydroconverted raffinate under catalytic dewaxing conditions in the presence of hydrogen and a catalytic dewaxing catalyst comprising a metal hydrogenation component and a crystalline 10 or 12 ring molecular sieve to yield a dewaxed hydroconverted raffinate; and (g) passing the dewaxed hydroconverted raffinate to a hydrofinishing zone and conducting cold hydrofinishing of the dewaxed hydroconverted raffinate in the presence of a hydrofinishing catalyst at a temperature of from 260 to 360° C., a hydrogen partial pressure of from 1000 to 2500 psig, a space velocity of from 0.2 to 5 LHSV and a hydrogen to feed ratio of from 500 to 5000 Scf/B to produce a lubricating oil basestock.

4. A process for selectively hydroconverting a raffinate produced from solvent refining a lubricating oil feedstock which comprises:

(a) conducting the lubricating oil feedstock to a solvent extraction zone and separating therefrom an aromatics rich extract and a paraffins rich raffinate;

(b) stripping the raffinate of solvent to produce a raffinate feed having a dewaxed oil viscosity index from about 85 to about 105 and a final boiling point of no greater than about 650° C.;

(c) passing at least a portion of the raffinate feed to a first hydroconversion zone and processing the raffinate feed in the presence of a non-acidic hydroconversion catalyst at a temperature of from 340 to 420° C., a hydrogen partial pressure of from 1000 to 2500 psig, space velocity of 0.2 to 3.0 LHSV and a hydrogen to feed ratio of from 500 to 5000 Scf/B to produce a first hydroconverted raffinate;

(d) passing the hydroconverted raffinate from the first hydroconversion zone to a second hydroconversion zone and processing the hydroconverted raffinate in the presence of a non-acidic hydroconversion catalyst at a temperature of from 340 to 400° C. provided that the temperature in the second hydroconversion is not greater than the temperature in the first hydroconversion zone, a hydrogen partial pressure of from 1000 to 2500 psig, a space velocity of from 0.2 to 3.0 LHSV and a hydrogen to feed ratio of from 500 to 5000 Scf/B to produce a second hydroconverted raffinate;

(e) solvent dewaxing the second hydroconverted raffinate under solvent dewaxing conditions to obtain a dewaxed oil having a pour point less than about 10° C.;

(f) catalytically dewaxing the solvent dewaxed oil under catalytic dewaxing conditions in the presence of hydrogen and a catalytic dewaxing catalyst comprising a metal hydrogenation component and a crystalline 10 or 12 ring molecular sieve to produce a catalytically dewaxed oil; and (g) passing the catalytically dewaxed oil to a hydrofinishing reaction zone and conducting cold hydrofinishing of the catalytically dewaxed oil in the presence of a hydrofinishing catalyst at a temperature of from 260 to 360° C., a hydrogen partial pressure of from 1000 to 2500 psig, a space velocity of from 0.2 to 5 LHSV and hydrogen to feed ratio of from 500 to 5000 Scf/B to produce a dewaxed lubricating oil basestock.

5. The process of claims 1 or 2 wherein there is no disengagement between the first hydroconversion zone, the second hydroconversion zone and the hydrofinishing reaction zone.

6. The process of claims 1, 2, 3 or 4 wherein the non-acidic hydroconversion catalyst is cobalt/molybdenum, nickel/molybdenum or nickel/tungsten on alumina.

7. The process of claims 1, 2, 3 or 4 wherein the hydrogen partial pressure in the first hydroconversion zone, the second conversion zone or the hydrofinishing zone is from 1000 to 2000 psig (7.0 to 12.5 mPa).

8. The process of claims 1, 2, 3 or 4 wherein the non-acidic hydroconversion catalyst has an acidity less than about 0.5, said acidity being determined by the ability of the catalyst to convert 2-methyl-2-pentene to 3-methyl-2-pentene and 4-methyl-2-pentene and is expressed as the mole ratio of 3-methyl-2-pentene to 4-methyl-2-pentene.

9. The process of claims 1, 2, 3 or 4 wherein the catalytic dewaxing catalyst is a zeolite selected from ZSM-5, ZSM-11, ZSM-12, theta-1, ZSM-23, ZSM-35, ferrierite, ZSM-48, ZSM-57, beta, mordenite and offretite.

10. The process of claims 1, 2, 3 or 4 wherein the catalytic dewaxing catalyst is an aluminum phosphate selected from SAPO-11, SAPO-31 and SAPO-41.

11. The process of claims 1, 2, 3 or 4 wherein the catalytic dewaxing catalyst is a composite of a crystalline molecular sieve and an amorphous component.

12. The process of claims 1, 2, 3 or 4 wherein the catalytic dewaxing catalyst is layered catalyst containing a first layer of amorphous component and a second layer of crystalline molecular sieve.

13. The process of claims 1, 2, 3 or 4 wherein the metal hydrogenation component of the catalytic dewaxing catalyst is at least one of a Group VI and Group VIII metal.

14. The process of claims 1 or 2 wherein the catalytic dewaxing step is followed by a cold hydrofinishing step.

15. The process of claim 11 wherein the amorphous component of the dewaxing catalyst is selected from silica-alumina, silica magnesia, halogenated alumina, yttria silica-alumina and mixtures thereof.

16. The process of claim 13 wherein the metal hydrogenation component is at least one of Pt or Pd.

17. The process of claims 2 or 4 wherein solvent dewaxing comprises mixing the hydrofinished raffinate with a chilled solvent to form an oil-solvent solution mixed with precipitated wax, separating precipitated wax from the oil-solvent solution, and separating the solvent from the solvent-oil solution thereby forming a solvent dewaxed oil.

18. The process of claim 17 wherein the solvent is at least one of propane, butane, methyl ethyl ketone, methyl isobutyl ketone, benzene, toluene and xylene.

* * * * *